(12) United States Patent
Kudo et al.

(10) Patent No.: US 7,126,794 B2
(45) Date of Patent: Oct. 24, 2006

(54) THIN FILM MAGNETIC HEAD INCLUDING HEAT DISSIPATION, METHOD OF MANUFACTURING THE SAME, AND MAGNETIC DISK DRIVE

(75) Inventors: Yoshihiro Kudo, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 128 days.

(21) Appl. No.: 10/408,569

(22) Filed: Apr. 8, 2003

(65) Prior Publication Data
US 2003/0193756 A1 Oct. 16, 2003

(30) Foreign Application Priority Data
Apr. 10, 2002 (JP) .............................. 2002-107973

(51) Int. Cl.
*G11B 5/39* (2006.01)
(52) U.S. Cl. ...................... 360/313; 360/319; 360/320; 360/97.02
(58) Field of Classification Search ................ 360/313, 360/317, 319, 320, 323, 324, 324.1, 97.02
See application file for complete search history.

(56) References Cited

U.S. PATENT DOCUMENTS

| | | | | |
|---|---|---|---|---|
| 5,644,455 | A * | 7/1997 | Schultz ........................ | 360/320 |
| 5,930,086 | A * | 7/1999 | Chaug et al. ................ | 360/313 |
| 5,966,273 | A | 10/1999 | Matsumoto et al. ........ | 360/320 |
| 6,154,347 | A * | 11/2000 | Sasaki ........................ | 360/317 |
| 6,198,608 | B1 | 3/2001 | Hong et al. .................. | 360/320 |
| 6,330,128 | B1 * | 12/2001 | Chang et al. ................ | 360/126 |
| 6,381,094 | B1 * | 4/2002 | Gill ............................. | 360/126 |
| 6,396,670 | B1 * | 5/2002 | Murdock ..................... | 360/319 |
| 6,636,395 | B1 * | 10/2003 | Terunuma .............. | 360/324.11 |
| 6,643,105 | B1 | 11/2003 | Nakamoto et al. .......... | 360/319 |
| 6,665,136 | B1 * | 12/2003 | Clinton et al. ................ | 360/55 |
| 6,700,752 | B1 * | 3/2004 | Dimitrov et al. ........... | 360/317 |
| 6,724,587 | B1 * | 4/2004 | Gill .......................... | 360/324.2 |
| 6,765,768 | B1 * | 7/2004 | Saito .......................... | 360/319 |
| 2001/0043446 | A1 * | 11/2001 | Barlow et al. .............. | 360/319 |

FOREIGN PATENT DOCUMENTS

| | | |
|---|---|---|
| JP | 61-242313 A | 10/1986 |
| JP | A 6-223331 | 8/1994 |
| JP | A-6-274830 | 9/1994 |

(Continued)

*Primary Examiner*—Jefferson Evans
(74) *Attorney, Agent, or Firm*—Oliff & Berridge, PLC

(57) ABSTRACT

Provided are a thin film magnetic head capable of inhibiting an excessive temperature rise while reducing its size in accordance with a higher recording density, and obtaining a higher read output, a method of manufacturing the same, and a magnetic disk drive using the thin film magnetic head. A heat dissipation layer for transferring heat generated in a magnetic transducer film to outside is disposed adjacent to the magnetic transducer film on a side, the side being opposite to a side facing a recording medium. In a gap layer for electrically insulating between the magnetic transducer film and a pair of shield layers, a portion of the gap layer in contact with an end surface of the magnetic transducer film on a side, the side being opposite to a side facing the recording medium is formed so as to have a thin thickness ranging from 2 nm to 30 nm inclusive. Thereby, the heat generated in the magnetic transducer film can be more effectively dissipated than previously possible, and a temperature rise can be inhibited. Therefore, an increase in electrical resistance can be inhibited, and a higher read output can be obtained.

5 Claims, 13 Drawing Sheets

FOREIGN PATENT DOCUMENTS

| | | |
|---|---|---|
| JP | A 10-222816 | 8/1998 |
| JP | 2000-018222 | 1/2000 |
| JP | 2000-182222 | 6/2000 |
| JP | 2000-340860 | 12/2000 |
| JP | A 2000-353308 | 12/2000 |
| JP | A-2001-56914 | 2/2001 |

\* cited by examiner

THIN FILM MAGNETIC HEAD INCLUDING HEAT DISSIPATION, METHOD OF MANUFACTURING THE SAME, AND MAGNETIC DISK DRIVE

BACKGROUND OF THE INVENTION

1. Field of the Invention

The present invention relates to a thin film magnetic head having a function of dissipating heat generated in a magnetoresistive effect film to outside, a method of manufacturing the same, and a magnetic disk drive comprising the thin film magnetic head.

2. Description of the Related Art

In recent years, an improvement in performance of thin film magnetic heads has been sought in accordance with an improvement in areal density of hard disk drives. As the thin film magnetic heads, composite thin film magnetic heads (hereinafter simply referred to as "thin film magnetic heads") are widely used. The composite thin film magnetic head comprises a laminate including a reproducing head portion having a magnetoresistive device (hereinafter referred to "MR device"), which is a kind of magnetic transducer, and a recording head portion having an inductive magnetic transducer.

As a typical MR device, a GMR device using a magnetic film (GMR film) exhibiting a giant magnetoresistive effect (hereinafter referred to as "GMR effect") is cited. In particular, a GMR device using a spin-valve type GMR film has been in the mainstream. The spin-valve type GMR film has a relatively simple structure, thereby is suitable for mass production, and exhibits a large change in magnetoresistance in spite of an extremely weak magnetic field. Such a GMR device has the following structure.

FIG. 18 shows a schematic sectional view of a structure of a conventional reproducing head portion including the GMR film. A reproducing head portion 110A has the following structure. On a base substrate (not shown) made of, for example, AlTiC ($Al_2O_3$—TiC) or the like, a bottom shield layer 101 made of a magnetic material is laminated with an insulating layer (not shown) made of, for example, aluminum oxide ($Al_2O_3$) or the like in between. On the bottom shield layer 101, a bottom gap layer 102 made of, for example, an insulating material such as aluminum oxide or the like is formed, and on the bottom gap layer 102, a GMR film 120 and an insulating layer 103 are formed so as to be adjacent to each other. On the GMR film 120 and the insulating layer 103, a top gap layer 105 is laminated. A bottom surface and a top surface of the GMR film 120 are in contact with the bottom gap layer 102 and the top gap layer 105, respectively. On one side end surface of the GMR film 120, a recording-medium-facing surface 119 facing a magnetic recording medium 11 is formed, and an end surface of the GMR film 120 on a side opposite to the recording-medium-facing surface 119 is in contact with the insulating layer 103. As in the case of the GMR film 120, a bottom surface and a top surface of the insulating layer 103 are in contact with the bottom gap layer 102 and the top gap layer 105, respectively. Further, on the top gap layer 105, a top shield layer 106 made of a magnetic material is laminated.

On the reproducing head portion 110A, a recording head portion (not shown) is laminated, and the combination of the reproducing head portion 110A and the recording head portion constitutes a thin film magnetic head 110.

In general, a length from the recording-medium-facing surface 119 to an end surface on a side opposite to the recording-medium-facing surface 119 in the MR device is called an MR height (or an MR device height). On the other hand, a length of the MR device in a direction perpendicular to a paper surface of FIG. 18 is a portion corresponding to a track width of a recording medium (hereinafter referred to as "MR device width"). Recently, in order to cope with a remarkable increase in recording density, the MR device width is becoming increasingly smaller. Accordingly, the MR height is also becoming increasingly smaller.

A problem resulting from heat generated in the MR device occurs due to a downsizing of the MR device. The problem is that due to the heat generated in the MR device, electromigration (a phenomenon in which a void is locally formed when metal atoms move in a conductor) or interlayer diffusion is induced, and as a result, it is difficult to sufficiently extend the lifetime of the MR device. The heat generated in the GMR device 120 is transferred to the top shield layer 106 and the bottom shield layer 101 through the top gap layer 105 and the bottom gap layer 102 to be dissipated. However, when the MR height and the MR device width become smaller, a heat dissipation area, that is, the whole surface area of the GMR film 120 is greatly reduced as a inevitable consequence, so sufficient heat dissipation can not be achieved. It can be considered that when the MR device becomes still thinner (smaller) in future, the temperature of the MR device will excessively rise to, for example, higher than 50° C., and as a result, electrical resistance of the thin film magnetic head will increase. In extreme cases, element diffusion may occur in the MR device, thereby characteristics of thin film magnetic head may be pronouncedly degraded. Further, it can be considered that even if the temperature of the MR film does not rise to as high as internal element diffusion occurs, a degradation in the characteristics resulting from the heat generated in the GMR film 120 such as a reduction in output during reproducing magnetically recorded information resulting from increased electrical resistance may occur.

As an MR device with improved heat dissipation, for example, a thin film magnetic head disclosed in Japanese Unexamined Patent Application Publication No. Hei 6-223331 is cited. In the thin film magnetic head disclosed in the publication, as an insulating layer of an MR device, a material with good insulation and good thermal conductivity such as a silicon film, a diamond-like carbon or the like is used so as to carry out heat dissipation of the MR device. Moreover, in a thin film magnetic head and a magnetic disk drive disclosed in Japanese Unexamined Patent Application Publication No. 10-222816, as not only an insulating layer of an MR device, but also a protective film of a magnetic head slider or a disk surface, a non-magnetic insulating film with a high heat dissipation ratio such as a hydrogen-containing amorphous carbon film, silicon-containing amorphous carbon, amorphous aluminum nitride or the like is used. Thereby, the occurrence of a phenomenon called thermal asperity (TA) resulting from heat caused by friction between the magnetic head slider and the magnetic disk, electromigration or the like can be prevented, so the characteristics of read output can be improved. However, even if the thermal conductivity of a component material around the MR device is higher, the heat dissipation area of the component around the MR device is relatively reduced resulting from a downsizing of the MR device, so heat dissipation capacity is limited.

The applicant of the present invention has been proposed a thin film magnetic head disclosed in Japanese Unexamined Patent Application Publication No. 2000-353308, which can overcome the above-described problem. An enlarged sectional view of a specific example of the thin film magnetic head disclosed in the publication is shown in FIG. 19. In the thin film magnetic head, a reproducing head portion 210A comprises a heat dissipation layer 104 in contact with a laminated surface of the GMR film 120, and heat generated in the GMR film 120 is dissipated to outside through the heat dissipation layer 104.

However, even in the case of the thin film magnetic head disclosed in the above publication, when a demand for a thinner MR device (a downsizing of the MR film in a thickness direction) grows in accordance with an even higher recording density in future, the heat dissipation layer 104 cannot have a sufficient thickness, and as a result, it can be expected that it will be more difficult to secure sufficient heat dissipation.

SUMMARY OF THE INVENTION

In view of the foregoing, it is an object of the invention to provide a thin film magnetic head capable of inhibiting an excessive rise in temperature while reducing its size in accordance with a higher recording density, and obtaining a higher read output, a method of manufacturing the same, and a magnetic disk drive using the thin film magnetic head.

A thin film magnetic head according to a first aspect of the invention comprises: a magnetic transducer film being disposed so that an end surface thereof faces a recording medium, and detecting a signal magnetic field from the recording medium; and a heat dissipation layer being disposed adjacent to the magnetic transducer film on a side, the side being opposite to a side facing the recording medium, and transferring heat generated in the magnetic transducer film to outside.

In the thin film magnetic head according to the first aspect of the invention, a magnetic transducer film being disposed so that an end surface thereof faces a recording medium, and detecting a signal magnetic field from the recording medium, and a heat dissipation layer being disposed adjacent to the magnetic transducer film on a side, the side being opposite to a side facing the recording medium, and transferring heat generated in the magnetic transducer film to outside are comprised, so the heat generated in the magnetic transducer film can be effectively dissipated, and a temperature rise can be inhibited.

A thin film magnetic head according to a second aspect of the invention comprises: a magnetic transducer film being disposed so that an end surface thereof faces a recording medium, and detecting a signal magnetic field from the recording medium; a pair of shield layers being disposed so as to surround an end surface of the magnetic transducer film on a side opposite to the end surface thereof, and film surfaces of the magnetic transducer film facing each other, and magnetically shielding the magnetic transducer film; and a gap layer being disposed between the magnetic transducer film and the pair of shield layers, and electrically insulating therebetween, wherein a portion of the gap layer in contact with the end surface of the magnetic transducer film on a side, the side being opposite to a side facing the recording medium has a thickness ranging from 2 nm to 30 nm inclusive.

In the thin film magnetic head according to the second aspect of the invention, a magnetic transducer film being disposed so that an end surface thereof faces a recording medium, and detecting a signal magnetic field from the recording medium, a pair of shield layers being disposed so as to surround an end surface of the magnetic transducer film on a side opposite to the end surface thereof, and film surfaces of the magnetic transducer film facing each other, and magnetically shielding the magnetic transducer film, and a gap layer being disposed between the magnetic transducer film and the pair of shield layers, and electrically insulating therebetween are comprised, and a portion of the gap layer in contact with the end surface of the magnetic transducer film on a side, the side being opposite to a side facing the recording medium has a thickness ranging from 2 nm to 30 nm inclusive, so heat generated in the magnetic transducer film can be effectively dissipated, and a temperature rise can be inhibited.

In a method of manufacturing a thin film magnetic head according to a first aspect of the invention, the thin film magnetic head comprises a magnetic transducer film being disposed so that an end surface thereof faces a recording medium, and detecting a signal magnetic field from the recording medium, and the method comprises the steps of: forming the magnetic transducer film; and forming a heat dissipation layer for transferring heat generated in the magnetic transducer film to outside so as to be disposed adjacent to the magnetic transducer film on a side, the side being opposite to a side facing the recording medium.

The method of manufacturing a thin film magnetic head according to the first aspect of the invention comprises the steps of forming a magnetic transducer film, and forming a heat dissipation layer for transferring heat generated in the magnetic transducer film to outside so as to be disposed adjacent to the magnetic transducer film on a side, the side being opposite to a side facing the recording medium, so the heat generated in the magnetic transducer film can be effectively dissipated, and a temperature rise can be inhibited.

In a method of manufacturing a thin film magnetic head according to a second aspect of the invention, the thin film magnetic head comprises a magnetic transducer film being disposed so that an end surface thereof faces a recording medium, and detecting a signal magnetic field from the recording medium, a pair of shield layers magnetically shielding the magnetic transducer film, and a gap layer electrically insulating between the magnetic transducer film and the pair of shield layers, and the method comprises the steps of forming the magnetic transducer film; forming the pair of shield layers so as to surround an end surface of the magnetic transducer film on a side opposite to the end surface, and film surfaces of the magnetic transducer film facing each other; and forming the gap layer between the magnetic transducer film and the pair of shield layers so that a portion of the gap layer in contact with the end surface of the magnetic transducer film on a side, the side being opposite to a side facing the recording medium has a thickness ranging from 2 nm to 30 nm inclusive.

The method of manufacturing a thin film magnetic head according to the second aspect of the invention comprises the steps of forming a magnetic transducer film, forming a pair of shield layers so as to surround the magnetic transducer film except for an end surface of the magnetic transducer film, and forming a gap layer between the magnetic transducer film and the pair of shield layers so that a portion of the gap layer in contact with the end surface of the magnetic transducer film on a side, the side being opposite to a side facing the recording medium has a thickness ranging from 2 nm to 30 nm inclusive, so heat generated in the magnetic transducer film can be effectively dissipated, and a temperature rise can be inhibited.

A magnetic disk drive according to a first aspect of the invention comprises: a recording medium; and a thin film magnetic head, wherein the film magnetic head comprises a magnetic transducer film being disposed so that an end surface thereof faces the recording medium, and detecting a signal magnetic field from the recording medium, and a heat dissipation layer being disposed adjacent to the magnetic transducer film on a side, the side being opposite to a side facing the recording medium, and transferring heat generated in the magnetic transducer film to outside.

In the magnetic disk drive according to the first aspect of the invention, the thin film magnetic head comprises a magnetic transducer film being disposed so that an end surface thereof faces the recording medium, and detecting a signal magnetic field from the recording medium, and a heat dissipation layer being disposed adjacent to the magnetic transducer film on a side, the side being opposite to a side facing the recording medium, and transferring heat generated in the magnetic transducer film to outside, so the heat generated in the magnetic transducer film can be effectively dissipated, and a temperature rise can be inhibited.

A magnetic disk drive according to a second aspect of the invention comprises: a recording medium; and a thin film magnetic head, wherein the thin film magnetic head comprises a magnetic transducer film being disposed so that an end surface thereof faces the recording medium, and detecting a signal magnetic field from the recording medium, a pair of shield layers being disposed so as to surround an end surface of the magnetic transducer film on a side opposite to the end surface thereof, and film surfaces of the magnetic transducer film facing each other, and magnetically shielding the magnetic transducer film, a gap layer being disposed between the magnetic transducer film and the pair of shield layers, and electrically insulating therebetween, wherein a portion of the gap layer in contact with the end surface of the magnetic transducer film on a side, the side being opposite to a side facing the recording medium has a thickness ranging from 2 nm to 30 nm inclusive.

In the magnetic disk drive according to the second aspect of the invention, the thin film magnetic head comprises a magnetic transducer film being disposed so that an end surface thereof faces the recording medium, and detecting a signal magnetic field from the recording medium, a pair of shield layers being disposed so as to surround an end surface of the magnetic transducer film on a side opposite to the end surface thereof, and film surfaces of the magnetic transducer film facing each other, and magnetically shielding the magnetic transducer film, and a gap layer being disposed between the magnetic transducer film and the pair of shield layers, and electrically insulating therebetween, wherein a portion of the gap layer in contact with the end surface of the magnetic transducer film on a side, the side being opposite to a side facing the recording medium has a thickness ranging from 2 nm to 30 nm inclusive, so heat generated in the magnetic transducer film can be effectively dissipated, and a temperature rise can be inhibited.

In the thin film magnetic head or the method of manufacturing a thin film magnetic head according to the first aspect of the invention, an insulating layer may be comprised between the magnetic transducer film and the heat dissipation layer. In this case, a portion of the insulating layer in contact with an end surface of the magnetic transducer film on a side, the side being opposite to a side facing the recording medium preferably has a thickness ranging from 2 nm to 30 nm inclusive.

In the thin film magnetic head or the method of manufacturing a thin film magnetic head according to the first aspect of the invention, the heat dissipation layer is preferably made of a material with a higher thermal conductivity than that of the insulating layer, more preferably a non-magnetic metallic material. More specifically, the heat dissipation layer preferably includes at least one selected from the group consisting of silver (Ag), aluminum (Al), gold (Au), beryllium (Be), bismuth (Bi), cobalt (Co), chromium (Cr), copper (Cu), iron (Fe), indium (In), iridium (Ir), magnesium (Mg), manganese (Mn), molybdenum (Mo), niobium (Nb), nickel (Ni), palladium (Pd), platinum (Pt), rhenium (Re), antimony (Sb), selenium (Se), tantalum (Ta), tellurium (Te), thorium (Th), titanium (Ti), thallium (Tl), vanadium (V), tungsten (W), yttrium (Y) and zirconium (Zr).

In the thin film magnetic head or the method of manufacturing a thin film magnetic head according to the first aspect of the invention, the heat dissipation layer is preferably formed so as to have a thickness corresponding to at least half of the thickness of the magnetic transducer film.

In the thin film magnetic head or the method of manufacturing a thin film magnetic head according to the first aspect of the invention, a pair of shield layers being disposed so as to face each other with the magnetic transducer film in between in a laminated direction, and magnetically shielding the magnetic transducer film may be further comprised. In this case, a distance between the heat dissipation layer and each of the pair of shield layers is preferably 2 nm or over.

In the thin film magnetic head or the method of manufacturing a thin film magnetic head according to the first aspect of the invention, a pair of gap layers being disposed between the magnetic transducer film and the pair of shield layers, and electrically insulating between the magnetic transducer film and the pair of shield layers may be further comprised. In this case, the insulating layer is preferably made of the same material as that of the pair of gap layers.

In the thin film magnetic head or the method of manufacturing a thin film magnetic head according to the second aspect of the invention, it is preferable that the pair of shield layers occupy a space corresponding to at least half of the thickness of the magnetic transducer film, and have a distance of at least 2 nm therebetween.

Other and further objects, features and advantages of the invention will appear more fully from the following description.

DETAILED DESCRIPTION OF THE PREFERRED EMBODIMENTS

Preferred embodiments of the present invention will be described in more detail below referring the accompanying drawings.

First Embodiment

Figure 1:
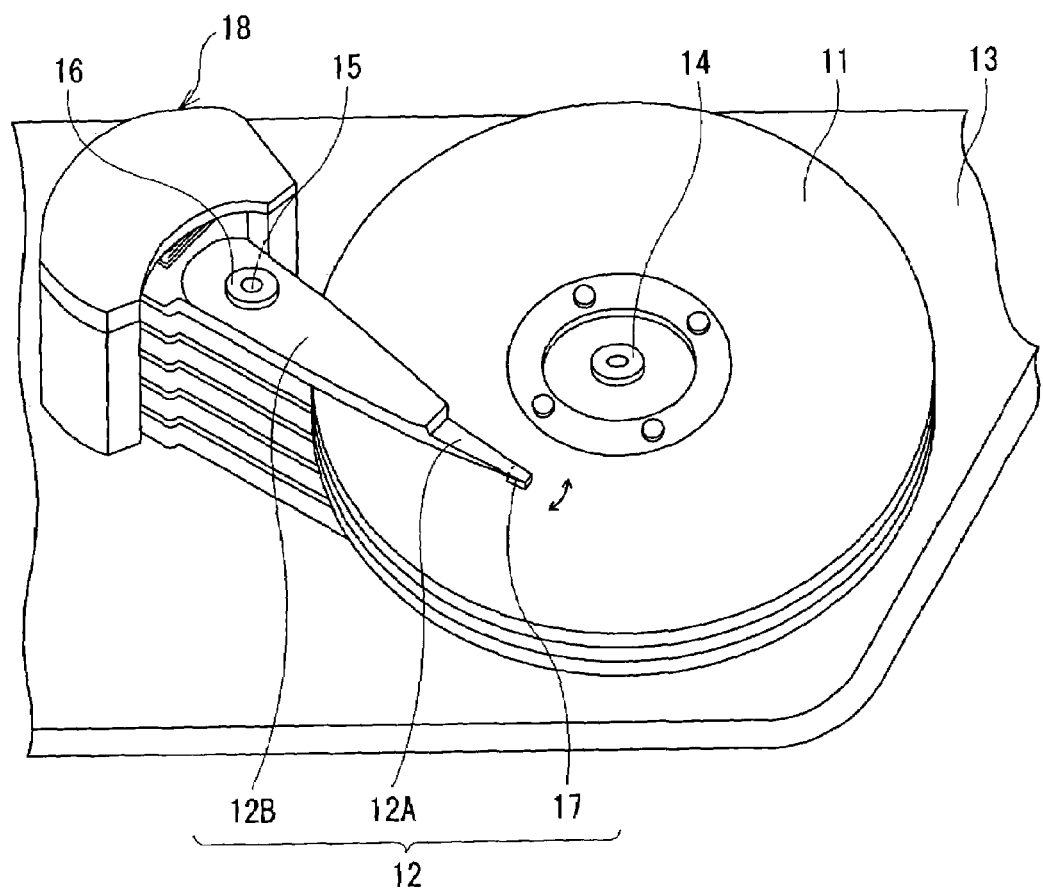
FIG. 1 is a schematic view of a magnetic disk drive according to a first embodiment of the invention.
Figure 2:
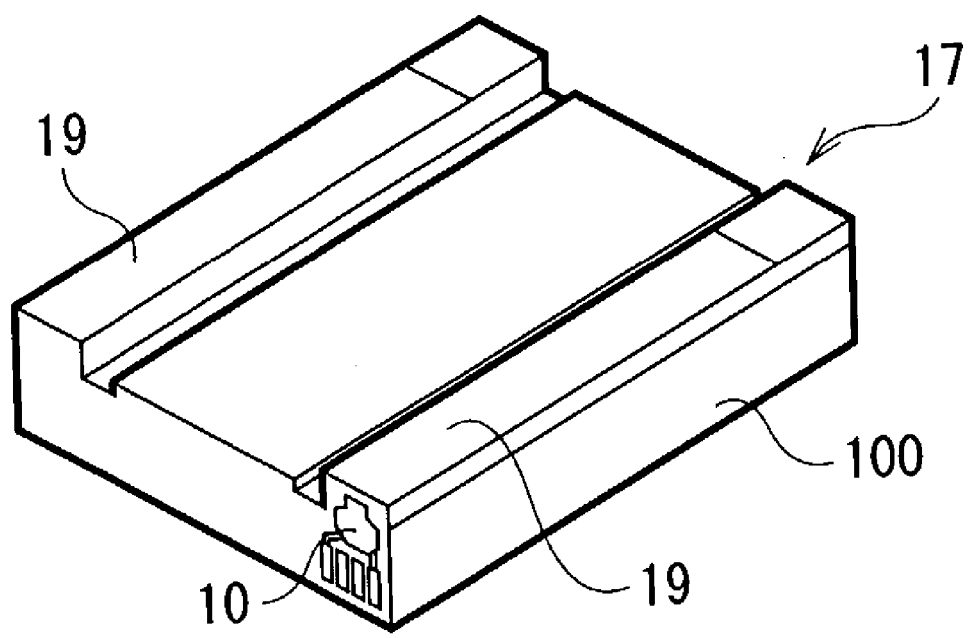
FIG. 2 is a perspective view of a magnetic head slider comprising a thin film magnetic head according to the first embodiment of the invention.
Figure 2:
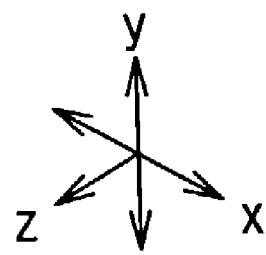

Referring to FIGS. 1 and 2, a magnetic disk drive using a thin film magnetic head according to a first embodiment of the invention will be described below. FIG. 1 shows a structure of a magnetic disk drive according to the first embodiment. In the embodiment, a magnetic disk drive using an operation mode called a CSS (contact-start-stop) operation mode is described as an example. The magnetic disk drive comprises a plurality of magnetic recording media 11 and a plurality of magnetic head apparatuses 12 each being disposed corresponding to a surface of each of the plurality of magnetic recording media 11. Herein, each of the magnetic recording media 11 corresponds to a specific example of "a recording medium" in the invention. The magnetic recording media 11 rotate by use of a spindle motor 14 fixed on a case 13. The magnetic head apparatuses 12 are mounted on a fixed shaft 15 fixed on the case 13 so as to be able to rotate with a bearing 16. Herein, the plurality of magnetic head apparatuses 12 are mounted on the fixed shaft 15 through the common bearing 16, so the plurality of magnetic head apparatuses 12 rotate as a unit. A magnetic head slider 17 (hereinafter simply referred to as slider 17) is mounted on a front end side of each of the magnetic head apparatuses 12. The magnetic disk drive further comprises a driving portion 18 on a rear end side of the magnetic head apparatuses 12, the driving portion 18 being for positioning the slider 17 on a track of each of the magnetic recording media 11. The driving portion 18 makes the magnetic head apparatuses 12 rotate around the fixed shaft 15 as a center, and the slider 17 can be moved in a radial direction of the magnetic recording medium 11 by the driving portion 18.

FIG. 2 shows an enlarged perspective view of the slider 17 shown in FIG. 1. The slider 17 has a base substrate 100 formed of, for example, AlTiC (Al$_2$O$_3$—TiC) in a substantially hexahedron shape. A surface of the slider 17 facing the magnetic recording medium 11 is a recording-medium-facing surface or an air bearing surface (ABS) 19. As shown in FIG. 2, a thin film magnetic head 10 is disposed on one side surface of the slider 17 orthogonal to the ABS 19.

Next, recording and reproducing by the magnetic disk drive with such a structure will be described below referring to FIG. 1. In the CSS operation mode, when the magnetic disk drive is not in operation, that is, in a state that the spindle motor 14 stops, so the magnetic recording medium 11 does not rotate, the ABS 19 of the slider 17 comes into contact with the magnetic recording medium 11. When recording and reproducing are performed, the magnetic recording medium 11 is rotated at high speed by the spindle motor 14. When the magnetic recording medium 11 rotates at high speed, an airflow occurs, thereby lifting power is generated. While the slider 17 is floated from the surface of the magnetic recording medium 11 by the lifting power, the slider 17 is relatively moved in a direction horizontal to the surface of the magnetic recording medium 11 by the driving portion 18. At this time, recording and reproducing are performed by the thin film magnetic head 10 formed on one side surface of the slider 17.

Next, referring to FIGS. 3 through 5, the thin film magnetic head 10 according to the embodiment will be described in more detail below.

Figure 3:
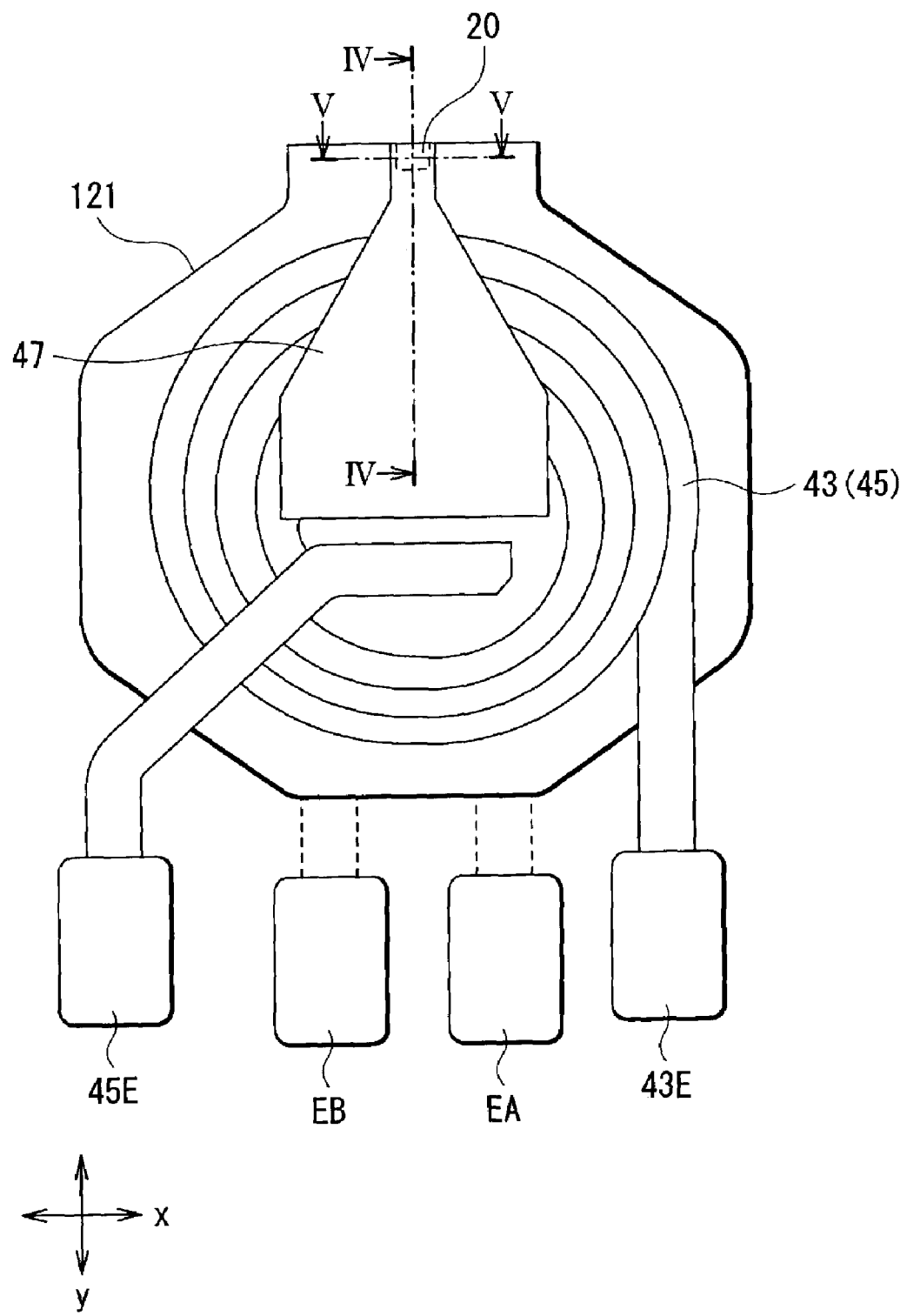
FIG. 3 is a plan view of the thin film magnetic head according to the first embodiment of the invention.

FIG. 3 shows an enlarged plan view of the thin film magnetic head 10 formed on one side surface of the slider 17 (refer to FIG. 2). FIG. 4 is a sectional view taken along a line IV—IV shown in FIG. 3. FIG. 5 is a sectional view taken along a line V—V shown in FIGS. 3 and 4. As shown in FIG. 4, the thin film magnetic head 10 comprises a laminate including a reproducing head portion 10A and a recording head portion 10B in order from the base substrate 100. The reproducing head portion 10A reproduces magnetic information recorded on the magnetic recording medium 11, on the other hand, the recording head portion 10B records magnetic information on a track of the magnetic recording medium 11.

At first, the structure of the reproducing head portion 10A will be described below referring to FIGS. 4 and 5. As shown in FIG. 4, the reproducing head portion 10A comprises, for example, a laminate including a bottom shield layer 1, a bottom gap layer 2, a GMR film 20, a top gap layer 5 and a top shield layer 6 in order on the base substrate 100 on a side exposed to the ABS 19.

The bottom shield layer 1 is made of, for example, a magnetic material such as a nickel iron alloy (NiFe) or the like, and has a function of preventing an influence of an unnecessary magnetic field on the GMR film 20 to be described later. The bottom gap layer 2 is made of an insulating material such as aluminum oxide (Al$_2$O$_3$), aluminum nitride (AlN) or the like to insulate between the bottom shield layer 1 and the GMR film 20. The GMR film 20 according to the embodiment corresponds to a specific example of "a magnetic transducer film" in the invention, which will be described later. As in the case of the bottom gap layer 2, the top gap layer 5 is made of an insulating material to insulate between the top shield layer 6 and the GMR film 20. As in the case of the bottom shield layer 1, the top shield layer 6 is made of a magnetic material such as a nickel iron alloy (NiFe) or the like, and has a function of preventing the influence of an unnecessary magnetic field on the GMR film 20. The top shield layer 6 also has a function as a bottom pole in the recording head portion 10B.

The GMR film 20 is a spin-valve type GMR film with a multilayer structure including a magnetic material, and has a function of reading information recorded on the magnetic recording medium 11. A bottom surface and a top surface of the GMR film 20 are in contact with the bottom gap layer 2 and the top gap layer 5, respectively. In the reproducing head portion 10A, the information recorded on the magnetic recording medium 11 is reproduced by use of a change in electrical resistance of the GMR film 20 in accordance with a signal magnetic field from the magnetic recording medium 11.

Figure 5:
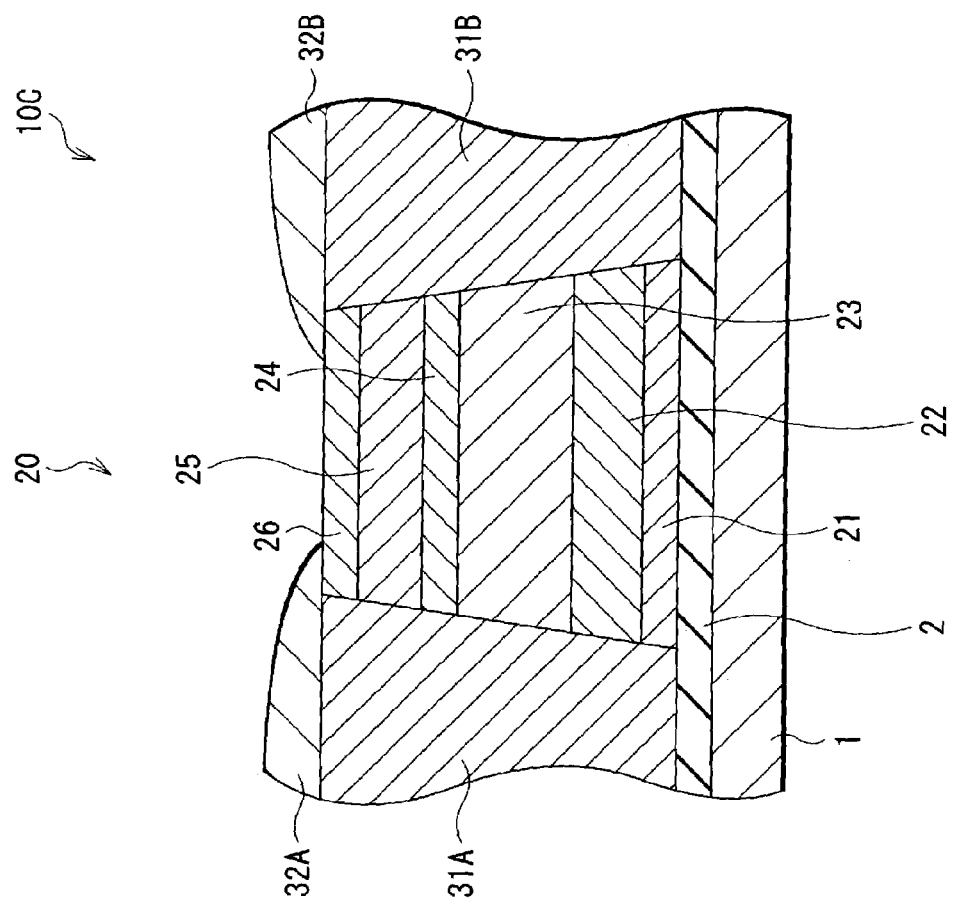
FIG. 5 is a sectional view of the thin film magnetic head taken along a line V—V of FIGS. 3 and 4.
Figure 5:
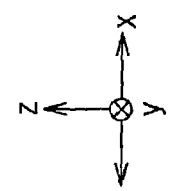

As shown in FIG. 5, a pair of magnetic domain control layers 31A and 31B (hereinafter collectively referred to as "magnetic domain control layers 31") extend on both sides of the GMR film 20 on the bottom gap layer 2. On the magnetic domain control layers 31, a pair of first lead layers 32A and 32B (hereinafter collectively referred to as "first lead layers 32") are formed, and on the first lead layers 32, a pair of second lead layers (not shown) are selectively formed so as to form a GMR device 10C. The magnetic domain control layers 31 are made of a hard magnetic material including a cobalt platinum alloy (CoPt) or the like, and extends on both sides of the GMR film 20 in a direction corresponding to a recording track width direction. The magnetic domain control layers 31 have a function of preventing the occurrence of Barkhausen noise through aligning directions of magnetic domains of a magnetic sensing layer 25 so as to form a single magnetic domain. The first lead layers 32 function as current paths for flowing a sense current into the GMR film 20 through the magnetic domain control layers 31, and are connected to electrodes EA and EB (refer to FIG. 3) through the second lead layers (not shown), respectively.

As shown in FIG. 5, the GMR film 20 comprises, for example, a laminate including a base layer 21, a pinning layer 22, a pinned layer 23, a non-magnetic layer 24, the magnetic sensing layer 25 called a free layer and a cap layer 26 in order on the bottom gap layer 2.

The base layer 21 is made of, for example, tantalum (Ta) or the like with a thickness of 5 nm. The pinning layer 22 is made of an antiferromagnetic material such as a platinum manganese alloy (PtMn) or the like, and has a function of pinning the direction of magnetization of the pinned layer 23. The pinned layer 23 made of a cobalt iron alloy (CoFe) is a magnetic layer of which the direction of magnetization is pinned by exchange coupling in an interface with the pinning layer 22. The non-magnetic layer 24 is made of, for example, a non-magnetic metallic material such as copper (Cu), gold (Au) or the like with a thickness of 3 nm. The magnetic sensing layer 25 is made of, for example, a cobalt iron alloy (CoFe) or the like with a thickness of 2 nm, and the direction of magnetization of the magnetic sensing layer 25 changes in accordance with a signal magnetic field from the magnetic recording medium 11. The cap layer 26 is made of, for example, tantalum or the like with a thickness of 1 nm.

In the reproducing head portion 10A with such a structure, the direction of magnetization of the magnetic sensing layer 25 changes in accordance with the signal magnetic field from the magnetic recording medium 11, so a relative change in connection with the direction of magnetization of the pinned layer 23 fixed in one direction by the pinning layer 22 occurs. At this time, when a sense current flows through the GMR film 20, a change in the direction of magnetization shows up as a change in electrical resistance. The signal magnetic field is detected by using the change so as to reproduce magnetic information.

Next, the structure of the recording head portion 10B will be described below. As shown in FIG. 4, the recording head portion 10B comprises the top shield layer 6 functioning as a bottom pole, a write gap layer 41, coils 43 and 45, photoresist layers 42, 44 and 46, and a top pole 47.

The write gap layer 41 is made of an insulating layer such as aluminum oxide or the like, and is formed on the top shield layer 6. The write gap layer 41 has an opening 41A (refer to FIGS. 3 and 4) for forming a magnetic path in a position corresponding to central portions of the coils 43 and 45. The coil 43 is formed around the opening 41A as a center on the write gap layer 41 with the photoresist layer 42 in between. Moreover, the photoresist layer 44 is formed in a predetermined pattern so the coil 43 is covered with the photoresist layer 44. On the photoresist layer 44, the coil 45 and the photoresist layer 46 with which the coil 45 is covered are formed. Herein, an end of the coil 43 and an end of the coil 45 are electrically connected to each other in a connecting portion (not shown) to function as a series of coils. Further, the other ends of the coils 43 and 45 are connected to electrodes 43E and 45E, respectively (refer to FIG. 3).

On the write gap layer 41, the opening 41A and the photoresist layers 42, 44 and 46, the top pole 47 made of, for example, a magnetic material with a high saturation magnetic flux density such as a NiFe alloy, iron nitride (FeN) or the like is formed. The top pole 47 is in contact with and is magnetically coupled to the top shield layer 6 through the opening 41A. Further, an overcoat layer (not shown) made of aluminum oxide or the like is formed so that the whole top surface of the recording head portion 10B is covered with the overcoat layer.

The recording head portion 10B with such a structure generates magnetic flux in a magnetic path including the top shield layer 6 and the top pole 47 by a current flowing through the coils 43 and 45, and magnetizes the magnetic recording medium 11 by a signal magnetic field generated in the vicinity of the write gap layer 41 by the magnetic flux so as to record information.

Figure 6:
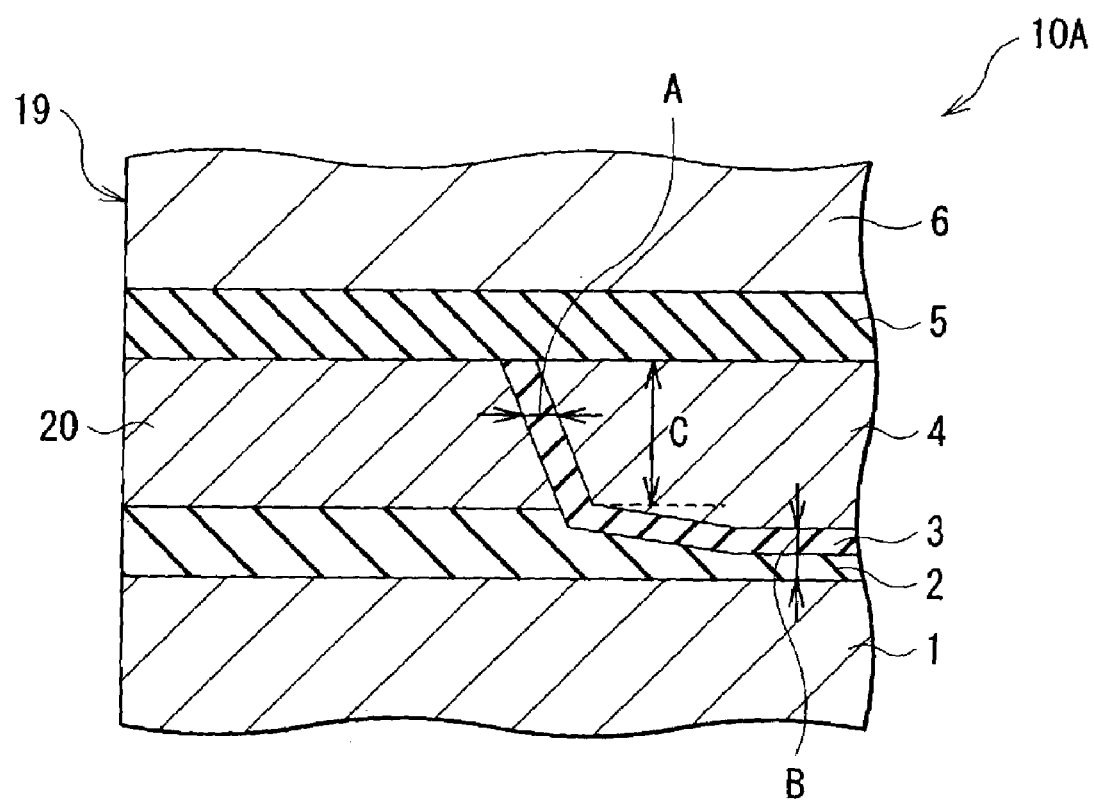
FIG. 6 is an enlarged sectional view of the thin film magnetic head according to the first embodiment of the invention in a direction perpendicular to a recording-medium-facing surface.

Next, referring to FIG. 6, the structure of a region in the vicinity of the GMR film 20 which is an important characteristic part of the invention will be described in detail below. FIG. 6 shows an enlarged sectional view of the GMR film 20 and its surroundings in the thin film magnetic head 10 shown in FIG. 4.

As shown in FIG. 6, the heat dissipation layer 4 having a function of dissipating the heat generated in the GMR film 20 is formed between the bottom gap layer 2 and the top gap layer 5 on a side adjacent to the GMR film 20 opposite to the ABS 19. Further, the insulating layer 3 is disposed between the GMR film 20 and the heat dissipation layer 4. The heat dissipation layer 4 is made of a material with a higher thermal conductivity than the insulating layer 3, more preferably a non-magnetic metallic material. More specifically, the heat dissipation layer 4 is preferably made of a material including at least one selected from the group consisting of elements shown in Table 1 such as, for example, bismuth (Bi), tantalum (Ta), platinum (Pt), palladium (Pd) or the like. Moreover, the heat dissipation layer 4 preferably has a thickness C which is at least half of the thickness of the GMR film 20, and a distance B between the heat dissipation layer 4 and the bottom shield layer 1 is preferably 2 nm or over. The distance between the heat dissipation layer 4 and the top shield layer 6, that is, a thickness of the top gap layer 5 is also preferably 2 nm or over. It is a minimum distance required to secure insulation between the heat dissipation layer 4 and the bottom shield layer 1, or between the heat dissipation layer 4 and the top shield layer 6. The amounts of the distance B and the thickness C will be described in detail later.

TABLE 1

| Material used for heat dissipation layer | Thermal conductivity [J/mKs] |
|---|---|
| Silver (Ag) | 420.0 |
| Aluminum (Al) | 223.0 |
| Gold (Au) | 298.0 |
| Beryllium (Be) | 18.9 |
| Bismuth (Bi) | 8.4 |
| Cobalt (Co) | 69.3 |
| Chromium (Cr) | 67.2 |
| Copper (Cu) | 395.0 |
| Iron (Fe) | 75.6 |
| Indium (In) | 23.9 |
| Iridium (Ir) | 58.8 |
| Magnesium (Mg) | 160.0 |
| Manganese (Mn) | 7.2 |
| Molybdenum (Mo) | 147.0 |
| Niobium (Nb) | 52.5 |
| Nickel (Ni) | 92.4 |
| Palladium (Pd) | 71.4 |
| Platinum (Pt) | 71.4 |
| Rhenium (Re) | 71.4 |
| Antimony (Sb) | 18.9 |
| Selenium (Se) | 2.9 |
| Tantalum (Ta) | 54.6 |
| Tellurium (Te) | 5.9 |
| Thorium (Th) | 37.8 |
| Titanium (Ti) | 17.1 |
| Thallium (Tl) | 39.1 |
| Vanadium (V) | 31.1 |
| Tungsten (W) | 167.0 |
| Yttrium (Y) | 10.1 |
| Zirconium (Zr) | 4.2 |

The insulating layer 3 is made of, for example, an insulating material such as aluminum oxide ($Al_2O_3$), aluminum nitride (AlN), silicon nitride ($Si_3N_4$) or the like. The insulating layer 3 made of the insulating material has a thermal conductivity of 2 J/mKs or less, which varies depending upon film formation conditions or measurement conditions. In this case, the insulating layer 3 may be made of the same material as that of the top gap layer 5 or the bottom gap layer 2. A portion of the insulating layer 3 in contact with at least an end surface of the GMR film 20 on a side, the side being opposite to a side facing the magnetic recording medium 11 (that is, the ABS 19) preferably has a thickness A ranging from 2 nm to 30 nm inclusive in a direction perpendicular to the ABS 19. The reason will be described later.

As shown in Table 1, as the material of the heat dissipation layer 4, a material with a higher thermal conductivity than the material of the insulating layer 3 is used.

Figure 19:
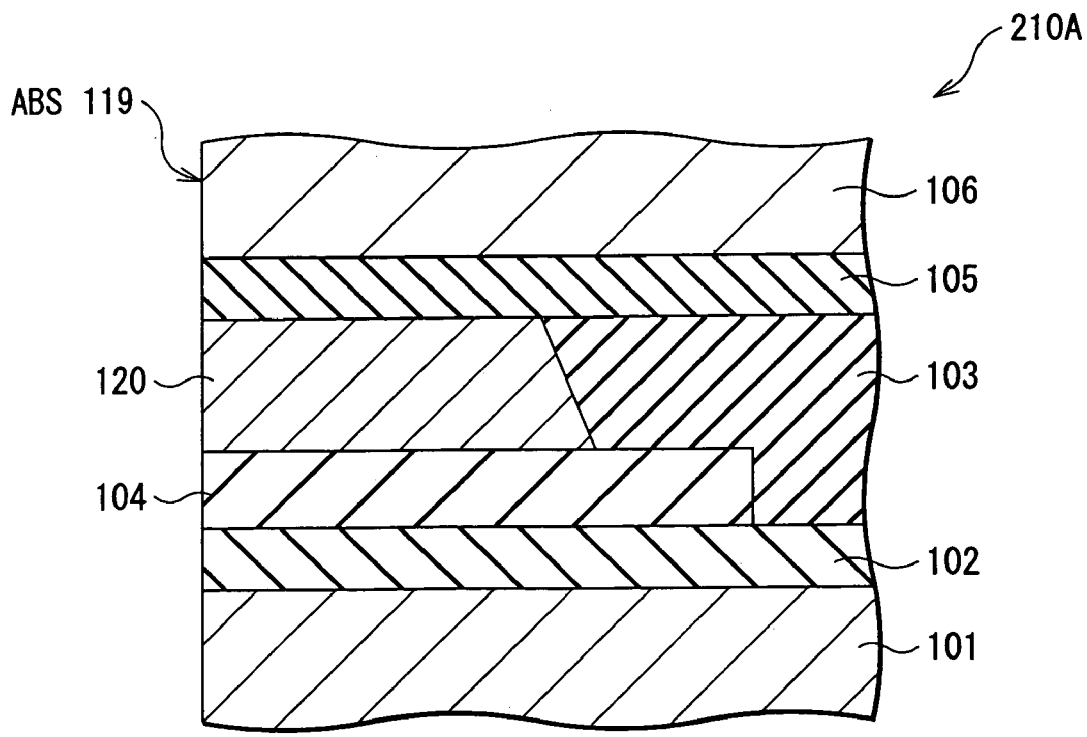
FIG. 19 is an enlarged sectional view of a thin film magnetic head as a comparative example in a direction perpendicular to a recording-medium-facing surface.

Next, effects of the embodiment will be described in contrast to a comparative example shown in FIG. 19. In the comparative example, a heat dissipation layer 104 is formed between a GMR film 120 and a bottom gap layer 102 so as to enhance heat dissipation. Even in the case of a thin film magnetic head comprising a reproducing head portion 210A with such a structure, it can be expected that when a demand for a thinner GMR device (a downsizing of a device including the GMR film 120 in a thickness direction) grows in accordance with an even higher recording density in future, it will be more difficult to secure sufficient heat dissipation.

It is because as a result of not only a reduced area of a laminated surface but also a reduced thickness in an MR device, a reduction in the thickness of the heat dissipation layer is required, so the volume of the heat dissipation layer may not be able to be sufficiently secured. Further, in the above reproducing head portion 210A, heat dissipation in one of the layers constituting the GMR film 120 disposed on a side far from the heat dissipation layer may not be sufficiently carried out.

On the other hand, in the reproducing head portion 10A according to the embodiment shown in FIG. 6, the heat dissipation layer 4 with a higher thermal conductivity than the insulating layer 3 is disposed adjacent to the GMR film 20 on a side opposite to the ABS 19 with the thin insulating layer 3 in between. In other words, the heat dissipation layer 4 is disposed in a rear space (a side opposite to the ABS 19) corresponding to the thickness of the GMR film 20. Even if the heat dissipation layer 4 has as large a thickness as the whole thickness of the GMR film 20, the whole thickness of the MR device will never increase. Therefore, in spite of the GMR film 20 with a reduced size, the heat dissipation layer 4 can have a sufficient volume, so heat can be sufficiently dissipated. Moreover, the heat dissipation layer 4 is directly in contact with all of the layers constituting the GMR film 20, so heat can be almost uniformly dissipated in a thickness direction (a laminated direction) of the GMR film 20. In other word, without increasing the thickness of the reproducing head portion 10A, heat can be uniformly and sufficiently dissipated.

Moreover, the material of the heat dissipation layer 4 has a higher thermal conductivity than the material of the insulating layer 3, so compared to the case where the whole rear space corresponding to the thickness of the GMR film 20 is filled with the insulating layer 3, heat can be efficiently dissipated.

Next, preferable ranges of the thickness A (of the insulating layer 3), the thickness C (of the heat dissipation layer 4) and the distance B shown in FIG. 6 will be described below. The thicknesses A and C are determined as follows in the viewpoint of securing heat dissipation and insulation.

Figure 7:
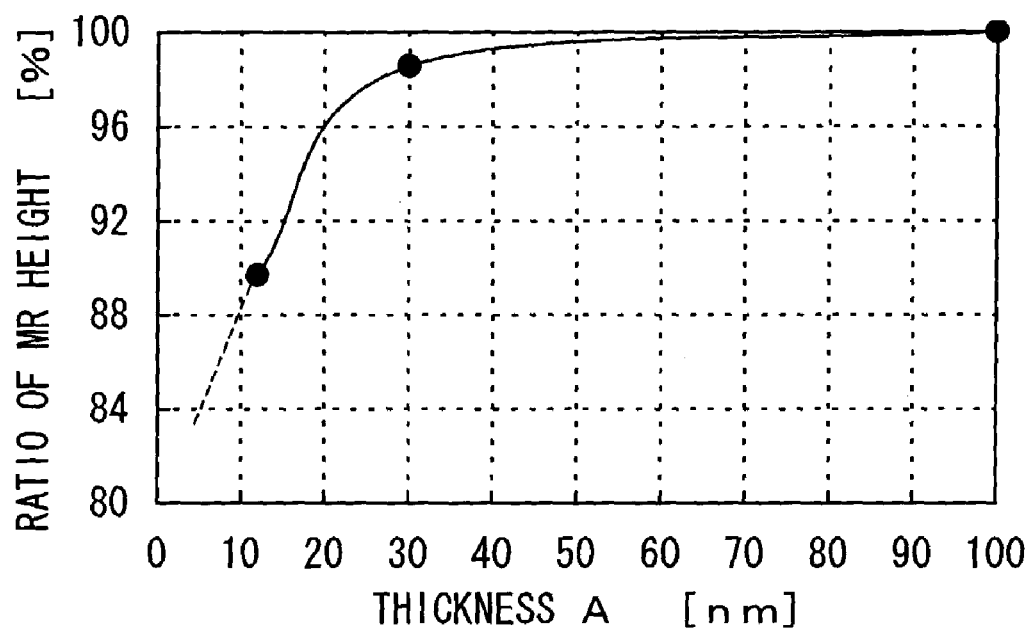
FIG. 7 is a plot showing a correlation between a thickness A of an insulating layer 3 and an MR height in the thin film magnetic head shown in FIG. 6.

The smaller (thinner) the thickness A of the insulating layer 3 is, the more heat dissipation will be improved. In other word, the thinner the thickness A is, the more quickly heat generated in the GMR film 20 can be transferred to the heat dissipation layer 4. FIG. 7 shows a plot of a correlation between the thickness A and the MR height. A lateral axis of the plot indicates the thickness A, and a vertical axis of the plot indicates a ratio of the MR height required to keep the temperature of the GMR film 20 constant on a basis that the ratio is equivalent to 100% in the case where the thickness A is 100 nm. Herein, the thickness C of the heat dissipation layer 4 is equivalent to 75% of the thickness of the GMR film 20. As shown in FIG. 7, the thinner the thickness A is, the more the MR height can be reduced. In other words, the thinner the thickness A is, the more heat dissipation will be improved, and the more the size of the GMR film 20 can be reduced. In this case, it can be judged that when the thickness A is approximately 30 nm or less, an effect of improving heat dissipation will be produced. However, the thickness A is required to be at least 2 nm in the viewpoint of securing insulation between the GMR film 20 and the heat dissipation layer 4.

Figure 8:
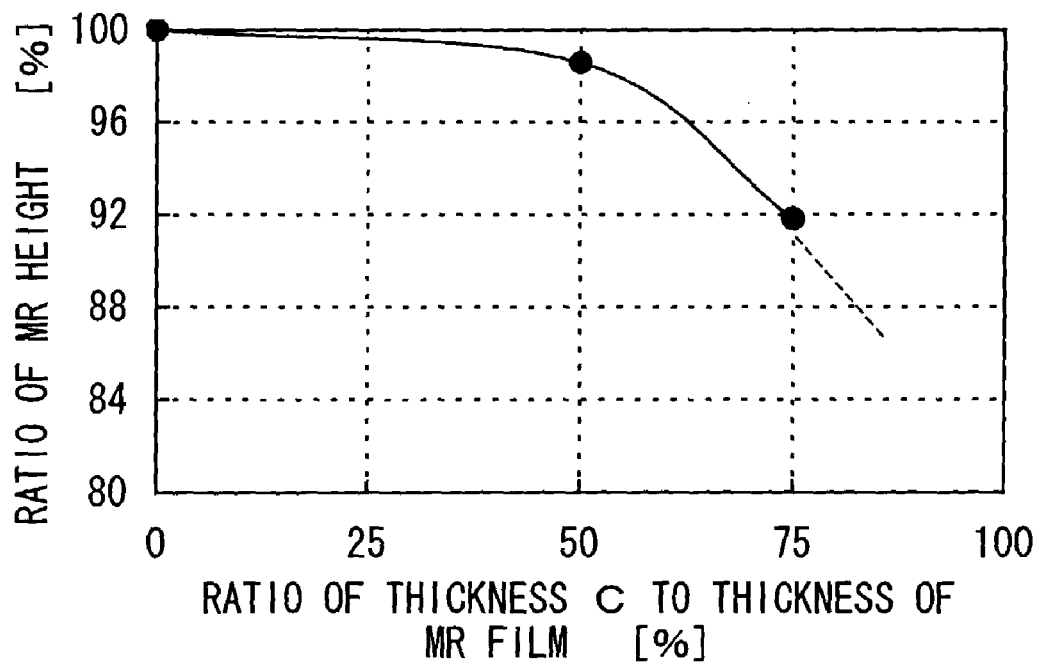
FIG. 8 is a plot showing a correlation between a thickness C of a heat dissipation layer 4 and the MR height in the thin film magnetic head shown in FIG. 6.

The larger (thicker) the thickness C of the heat dissipation layer 4 is, the more heat dissipation will be improved. In other words, the larger the thickness C is, the larger a portion corresponding to a thickness direction of the GMR film 20 will be, so heat can be efficiently dissipated. FIG. 8 shows a plot of a correlation between the thickness C and the MR height. A lateral axis of the plot indicates a ratio of the thickness C in the case where the thickness of the GMR film 20 is equivalent to 100%, and a vertical axis of the plot indicates a ratio of the MR height required to keep the temperature of the GMR film 20 constant on a basis that the ratio of the MR height is equivalent to 100% in the case where no heat dissipation layer 4 is disposed. As shown in FIG. 8, the thicker the thickness C is, the more heat dissipation will be improved, and the more the size of the GMR film 20 can be reduced. In this case, it can be judged that when the thickness C has a thickness equivalent to approximately 50% or over of the thickness of the GMR film 20, an effect of improving heat dissipation will be produced. The upper limit of the thickness C is determined by the distance B in viewpoint of securing insulation between the heat dissipation layer 4 and the bottom shield layer 1. The distance B is preferably 2 nm or over.

Figure 18:
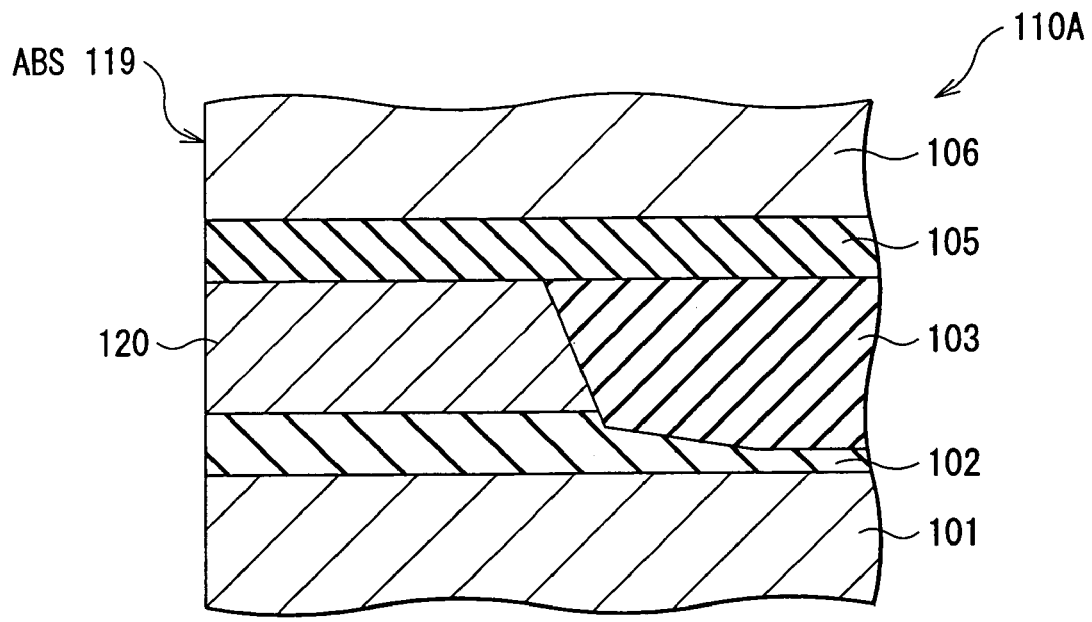
FIG. 18 is an enlarged sectional view of a conventional thin film magnetic head in a direction perpendicular to a recording-medium-facing surface.

Next, output characteristics of the thin film magnetic head 10 according to the embodiment shown in FIG. 4 which is manufactured in the above-described manner will be described in detail in contrast to a conventional example (refer to FIG. 18).

Figure 4:
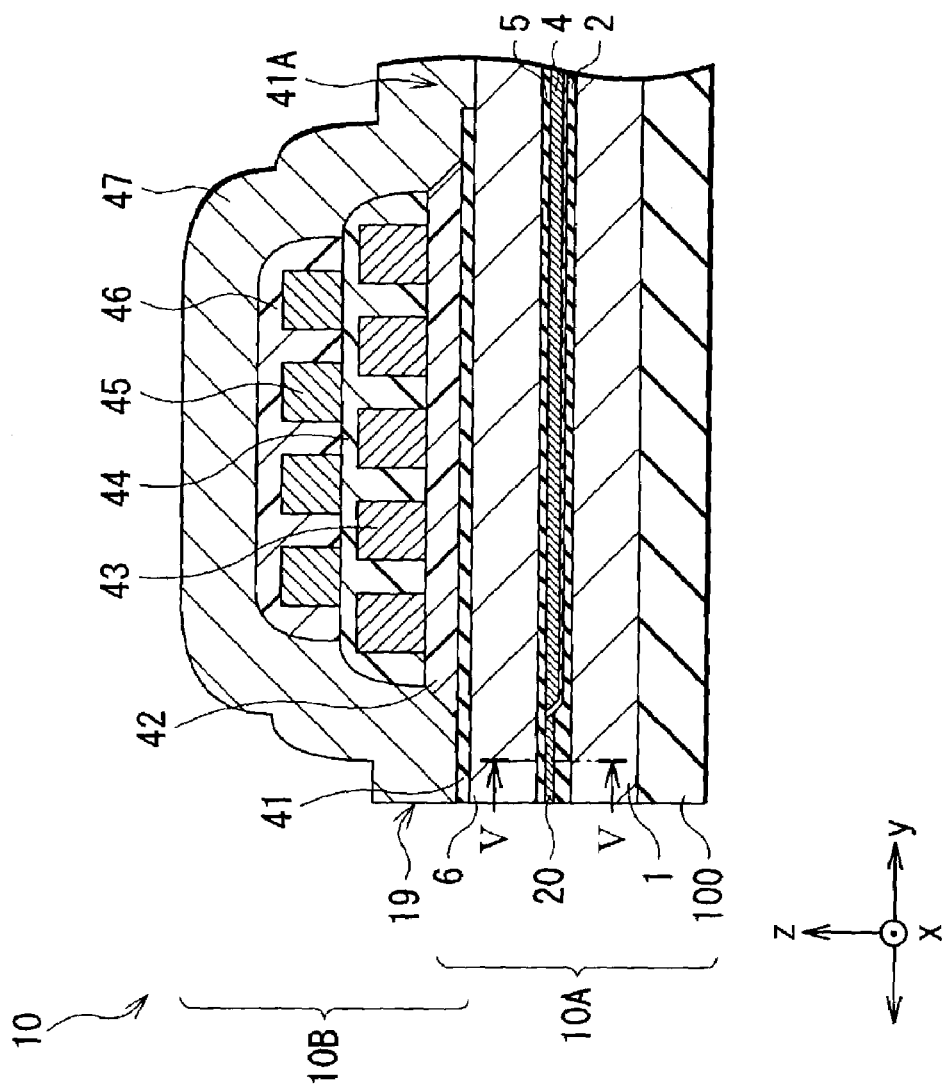
FIG. 4 is a sectional view of the thin film magnetic head taken along a line IV—IV of FIG. 3.
Figure 9:
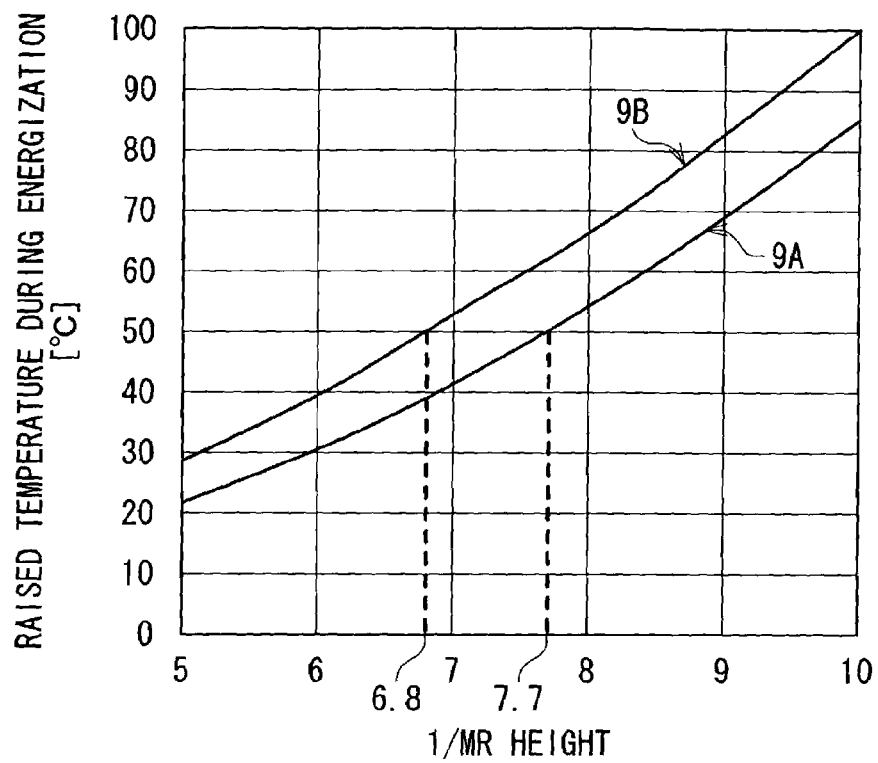
FIG. 9 is a plot showing a correlation between the MR height and a raised temperature in the thin film magnetic head shown in FIG. 6.

FIG. 9 shows a correlation between the MR height and a raised temperature during energization in the thin film magnetic head 10 shown in FIG. 4. A vertical axis of FIG. 9 indicates a raised temperature (° C.) of the GMR film 20 (120) during energization. A lateral axis of FIG. 9 indicates a reciprocal of the MR height ("1/MR height") on a basis that the reciprocal is equivalent to 10 when the raised temperature is 100° C. A magnitude Is of a sense current passing through the GMR film 20 (120) is 4.0 mA. In FIG. 9, a curve 9A indicates a result of the thin film magnetic head 10, and a curve 9B indicates a result of the conventional example.

As indicated by the curve 9B, in the conventional example, in order to limit the raised temperature to 50° C. or less, the "1/MR height" is required to be approximately 6.8 or less, that is, the MR height is required to have a length of 1/6.8 or over. On the other hand, as indicated by the curve 9A, in the thin film magnetic head 10 according to the embodiment, when the "1/MR height" is approximately 7.7 or less, that is, the MR height has a length of 1/7.7 or over, the raised temperature can be limited to 50° C. or less. Therefore, the thin film magnetic head 10 according to the embodiment comprising the heat dissipation layer 4 has superior heat dissipation and an advantage in a downsizing of the MR device.

Figure 10:
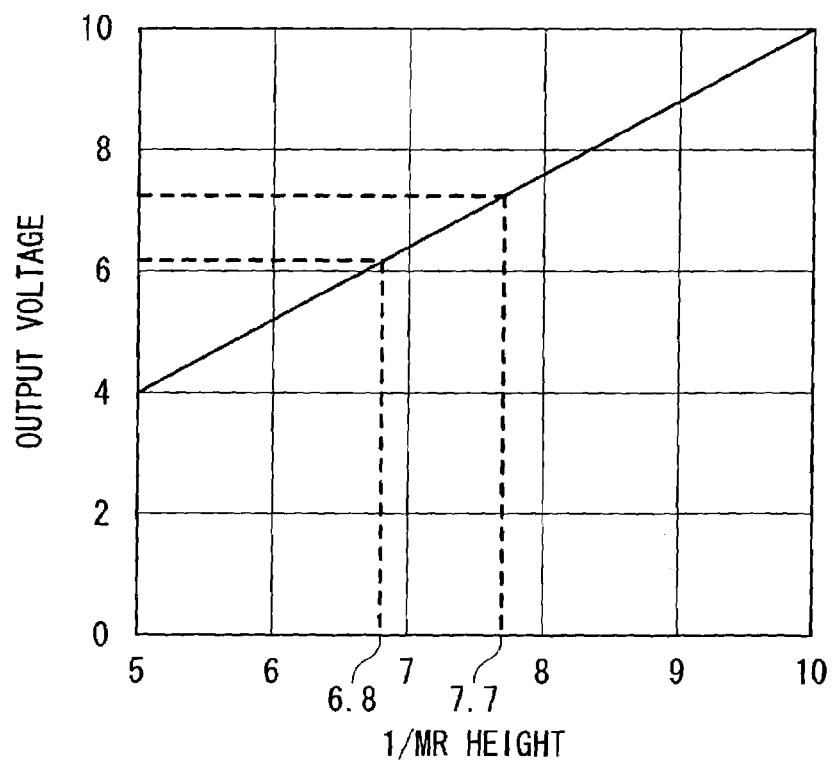
FIG. 10 is a plot showing a correlation between the MR height and an output voltage in the thin film magnetic head shown in FIG. 6.

FIG. 10 shows a correlation between the MR height and an output voltage in the thin film magnetic head 10 shown in FIG. 4. A lateral axis of FIG. 10 indicates the "1/MR height" corresponding to FIG. 9. On the other hand, a vertical axis of FIG. 10 indicates an output voltage on a basis that the output voltage is equivalent to 10 when the "1/MR height" is 10.

As shown in FIG. 10, the smaller the MR height is, the more a current density is improved, so an improvement in the output voltage can be expected. For example, in the conventional example, when the "1/MR height" is 6.8 in which the raised temperature becomes 50° C., the output voltage is approximately 6.25. On the other hand, in the thin film magnetic head 10 according to the embodiment, when the "1/MR height" is 7.7 in which the raised temperature becomes 50° C., the output voltage is approximately 7.25. In other words, when an acceptable raised temperature is 50° C., the minimum size of the MR height is reduced from 1/6.8 to 1/7.7, thereby, the output voltage is improved from approximately 6.25 to approximately 7.25, that is, an approximately 1.16 times improvement is achieved. In other words, the thin film magnetic head 10 according to the embodiment comprising the heat dissipation layer 4 can inhibit the temperature rise in spite of a downsizing, so the output voltage can be further improved.

Next, a method of manufacturing the thin film magnetic head 10 will be described below referring to drawings.

Figure 11:
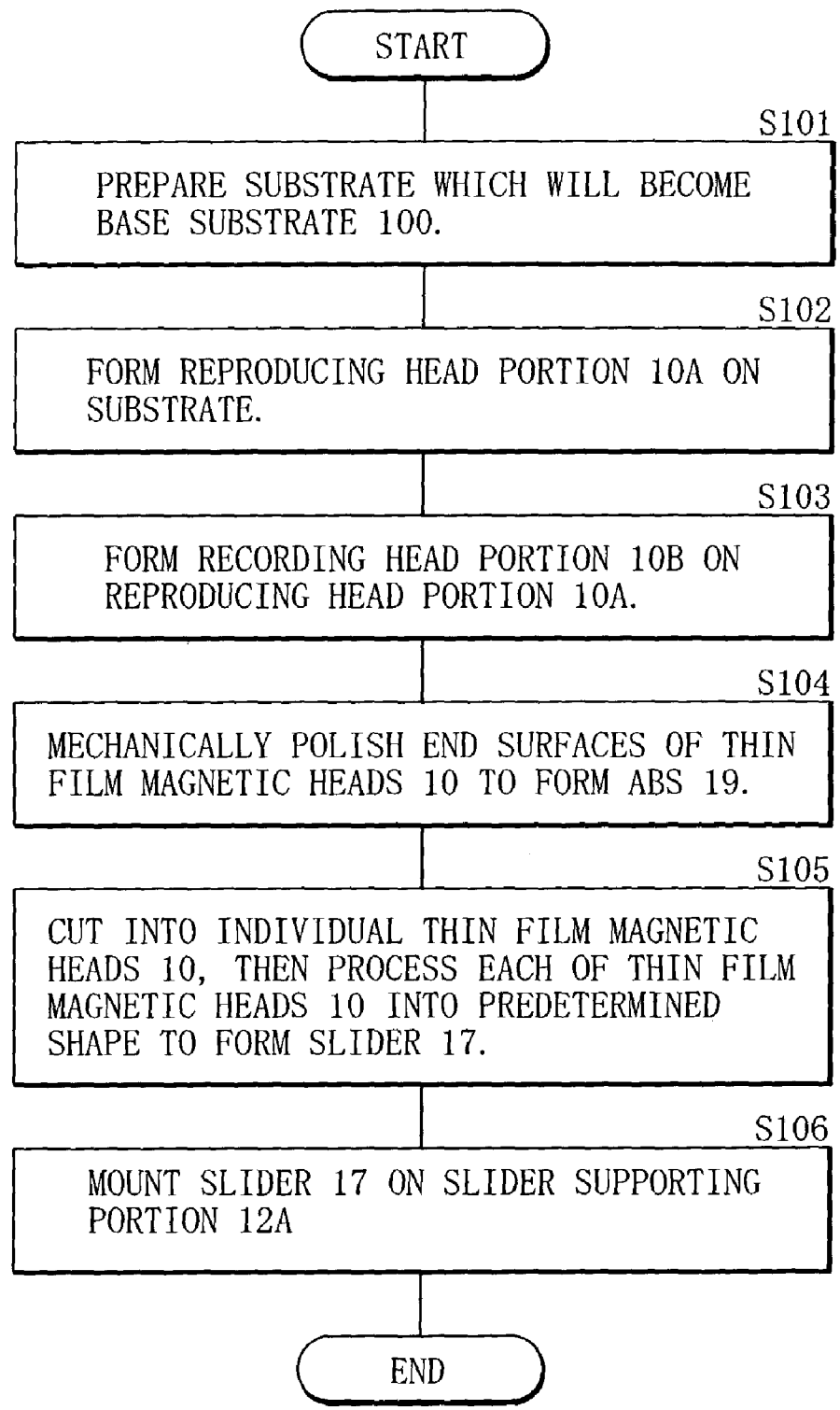
FIG. 11 is a flowchart showing a method of manufacturing the thin film magnetic head according to the first embodiment of the invention.

At first, referring to FIG. 11, a method of manufacturing a magnetic head apparatus will be described before describing a method of manufacturing the thin film magnetic head. FIG. 11 shows a flowchart of a method of manufacturing the magnetic head apparatus 12 shown in FIG. 1.

First of all, a substrate (not shown) made of AlTiC (a composite material of aluminum oxide and titanium carbide) or the like is prepared (step S101). The substrate will ultimately become the base substrate 100, and has a region large enough to form a plurality of thin film magnetic heads 10 thereon. Next, on the substrate, the reproducing head portion 10A having a multilayer film 20A which will become the GMR film 20 in a later step is formed (step S102), and on the reproducing head portion 10A, the recording head portion 10B is formed so as to tentatively complete the thin film magnetic heads 10 (step S103). Then, the thin film magnetic heads 10 are cut into each line to form a bar of the thin film magnetic heads 10, and an end surface orthogonal to a film forming surface of the bar of the thin film magnetic heads 10 is mechanically polished so as to form the ABS 19 (step S104). Then, after the bar is cut into individual thin film magnetic heads 10, each of the individual thin magnetic heads 10 is processed into a predetermined shape to form the slider 17 (step S105). Finally, the slider 17 is mounted on a slider supporting portion 12A to complete the magnetic head apparatus 12 (step S106). As described above, the magnetic head apparatus 12 shown in FIG. 1 is completed.

Next, referring to FIGS. 3 through 5 and FIGS. 12 through 16, a method of manufacturing the thin film magnetic head 10 will be described in detail below.

Figure 12:
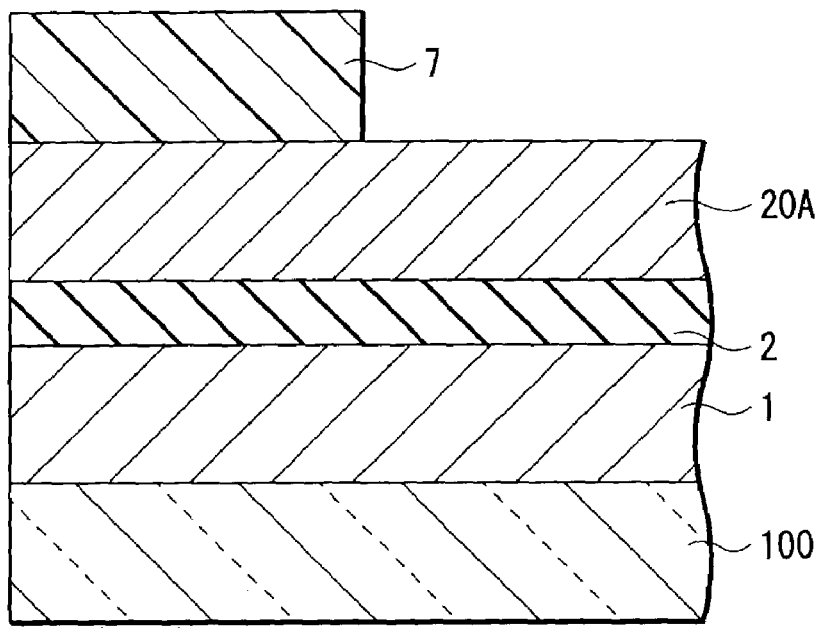
FIG. 12 is a sectional view showing one step in the method of manufacturing the thin film magnetic head according to the first embodiment of the invention.
Figure 13:
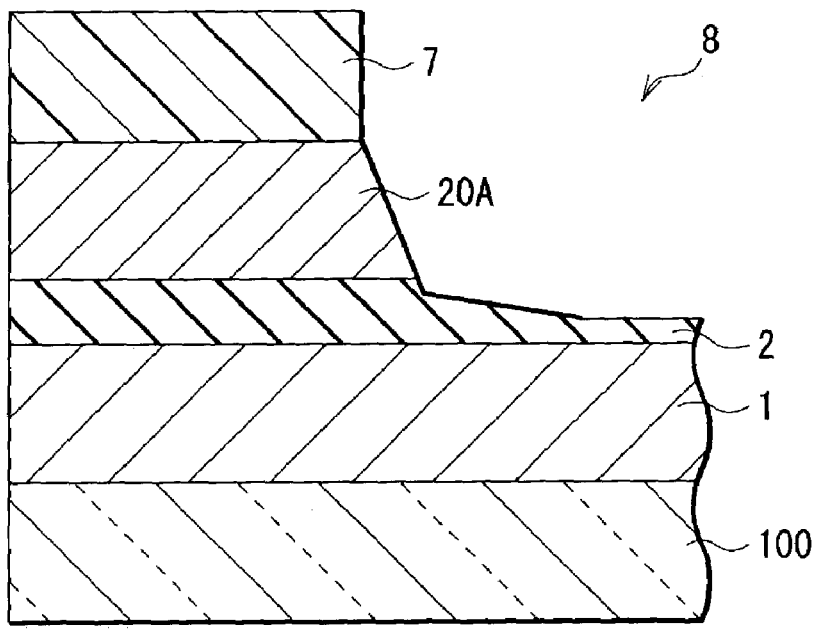
FIG. 13 is a sectional view showing a step following the step shown in FIG. 12.
Figure 14:
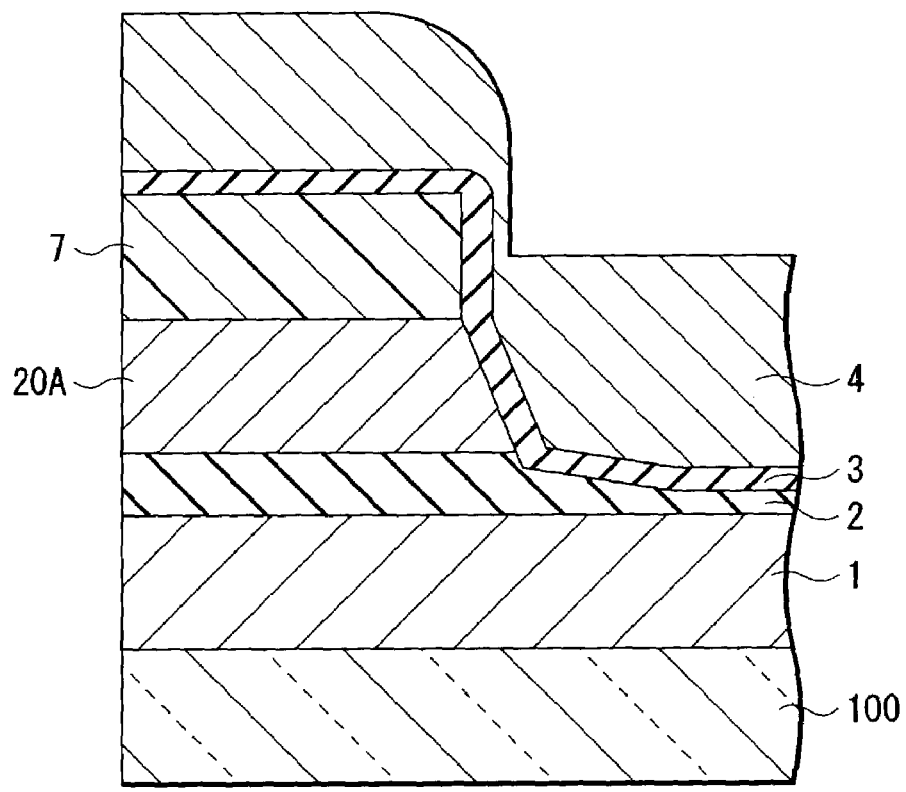
FIG. 14 is a sectional view showing a step following the step shown in FIG. 13.

At first, mainly referring to FIGS. 12 through 16, a method of manufacturing the reproducing head portion 10A will be described below. FIGS. 12 through 16 are sectional views showing each step in a method of manufacturing a thin film magnetic head according to the embodiment. First of all, as shown in FIG. 12, after the bottom shield layer 1 made of an electrically conductive magnetic material such as a NiFe alloy or the like is formed on the substrate which will become the base substrate 100 in a later step through sputtering or the like, the bottom gap layer 2 made of aluminum oxide or the like is formed over the whole surface of the bottom shield layer 1. Next, the multilayer film 20A which will become the GMR film 20 with a spin-valve structure in a later step is formed over the whole surface of the bottom gap layer 2. More specifically, the base layer 21, the pinning layer 22, the pinned layer 23, the non-magnetic layer 24, the magnetic sensing layer 25 and the cap layer 26 are laminated in order through sputtering or the like (refer to FIG. 5). Further, the photoresist layer 7 is selectively formed on the multilayer film 20A through photolithography. After that, as shown in FIG. 13, the multilayer film 20A and the bottom gap layer 2 are selectively etched through ion milling or the like by use of the photoresist layer 7 as a mask. In an etching step, the multilayer film 20A in a region which is not covered with the photoresist layer 7 is thoroughly removed in a thickness direction, and the bottom gap layer 2 in a region which is not covered with the photoresist layer 7 is also removed in a thickness direction in partway. Next, as shown in FIG. 14, the insulating layer 3 and the heat dissipation layer 4 are laminated in order on an etched removed portion 8 through sputtering or the like. By the above step, the heat dissipation layer 4 is formed so as to be disposed adjacent to the GMR film 20 on a side, the side being opposite to a side facing the magnetic recording medium 11, and the insulating layer 3 sandwiched between the GMR film 20 and the heat dissipation layer 4 is formed.

Figure 15:
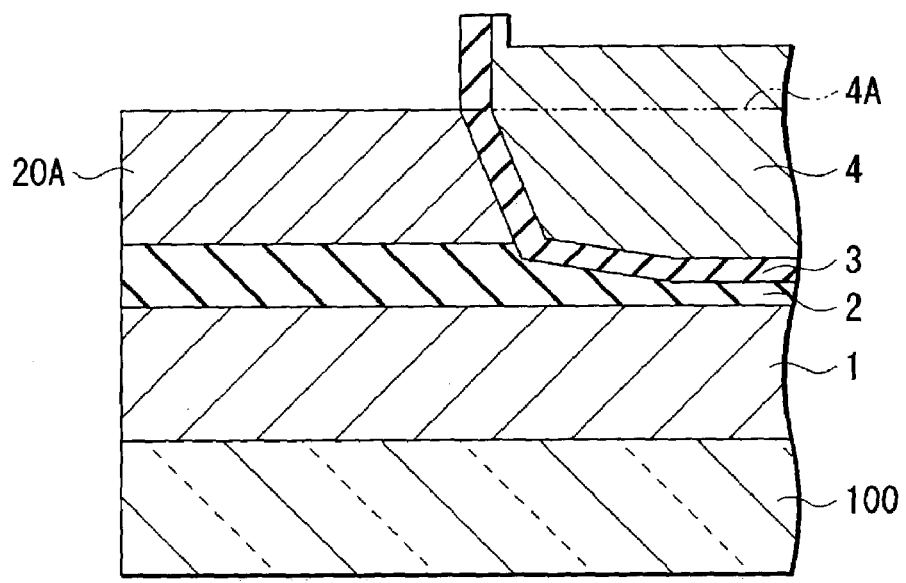
FIG. 15 is a sectional view showing a step following the step shown in FIG. 14.
Figure 16:
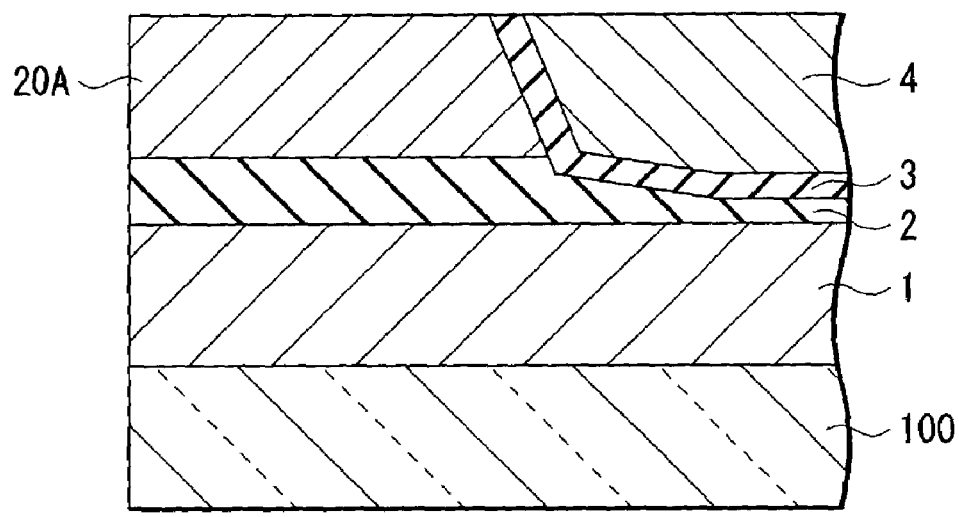
FIG. 16 is a sectional view showing a step following the step shown in FIG. 15.

Next, as shown in FIG. 15, after the photoresist layer 7 is lifted off, an unnecessary portion above an etching position 4A (in a direction away from the base substrate 100) is removed through reactive ion etching (RIE) or the like. Thus, as shown in FIG. 16, a top surface composed of the multilayer film 20A, the insulating layer 3 and the heat dissipation layer 4 can be formed so as to be aligned flat. After that, a pair of the magnetic domain control layers 31, a pair of the first lead layers 32 and a pair of the second lead layers (all not shown in FIG. 16) are laminated in a direction perpendicular to a paper surface of FIG. 16 so as to face each other with the multilayer film 20A in between. Then, the top gap layer 5 is formed through, for example, sputtering so that the whole surface is covered with the top gap layer 5. Further, on the top gap layer 5, the top shield layer 6 made of an electrically conductive magnetic material such as a NiFe alloy or the like is selectively formed.

Thus, the formation of the reproducing head portion 10A comprising the spin-valve type GMR film 20, the heat dissipation layer 4, the insulating layer 3 and a path for flowing a current into the GMR film 20 in a direction perpendicular to a film forming surface (that is, the top shield layer 6, the top gap layer 5, the bottom gap layer 2 and the bottom shield layer 1) is tentatively completed.

Next, referring to FIGS. 3 and 4, a method of manufacturing the recording head portion 10B formed on the reproducing head portion 10A will be described below. Firstly, after the write gap layer 41 made of an insulating material is selectively formed on the top shield layer 6 through sputtering or the like, the write gap layer 41 is partially etched so as to form the opening 41A for forming a magnetic path.

Then, after the photoresist layer 42 is formed in a predetermined pattern on the write gap layer 41, the coil 43 having a spiral shape around the opening 41A as a center is formed. The photoresist layer 44 which determines a throat height is formed in a predetermined pattern so as to coat the coil 43. The throat height is a distance from a front end of the photoresist layer 44 in which the coil 43 is embedded to the ABS 19. Next, the coil 45 and the photoresist layer 46 are repeatedly formed on the photoresist layer 44 if necessary. In the embodiment, the coil is laminated in two layers, but the coil may be laminated in one layer or three layers or more.

After the photoresist layer 46 is formed, the top pole 47 is selectively formed on the write gap layer 41, the opening 41A and the photoresist layers 44 and 46. Next, the write gap layer 41 is selectively etched through ion milling or the like by use of the top pole 47 as a mask. Further, a resist layer (not shown) is formed, and by use of the resist layer as a mask, a region of the top shield layer 6 in the vicinity of a region where the ABS 19 is formed is selectively etched to a predetermined depth. Thereby, the formation of the recording head portion 10B is tentatively completed.

Finally, an overcoat layer (not shown) made of an insulating material such as aluminum oxide or the like is formed so that all components including the top pole 47 are coated with the overcoat layer. Thus, the formation of the thin film magnetic head 10 comprising the reproducing head portion 10A and the recording head portion 10B is completed.

As described above, the thin film magnetic head 10 according to the embodiment comprises the heat dissipation layer 4 which is formed adjacent to the GMR film 20 on a side opposite to the ABS 19, and has a function of dissipating heat generated in the GMR film 20 to outside, so heat dissipation can be further improved. In other words, heat in the GMR film 20 is transferred to the heat dissipation layer 4 made of a material with a higher thermal conductivity through the thin insulating layer 3, thereby the heat can be efficiently dissipated. Accordingly, a downsizing of the MR device can be achieved without degradation in the output voltage due to increased electrical resistance or pronounced degradation in reproducing characteristics due to internal diffusion in the MR device.

More specifically, in the thin film magnetic head 10 according to the embodiment, the heat dissipation layer 4 is disposed adjacent to the GMR film 20 in a direction orthogonal to the ABS 19, so the heat dissipation layer 4 with a sufficient volume can be provided without any effect due to a reduction in the MR height. Moreover, surroundings of the heat dissipation layer 4 are occupied by an insulating material, so various electrically conductive materials with a high thermal conductivity can be used as the heat dissipation layer 4 without concern for constraints on electrical insulation.

Second Embodiment

Next, a second embodiment of the invention will be described below. In the following description, like components are denoted by like numerals as of the first embodiment and will not be further explained.

A thin film magnetic head according to the embodiment comprises a magnetic transducer film which is disposed so as to face a recording medium, a gap layer and a pair of shield layers, and a portion of the gap layer in contact with an end surface of the magnetic transducer film on a side, the side being opposite to a side facing the recording medium has a thickness ranging from 2 nm to 30 nm inclusive. Herein, a characteristic part different from the first embodiment, that is, only the structure of a reproducing head portion in the thin film magnetic head will be described below.

Figure 17:
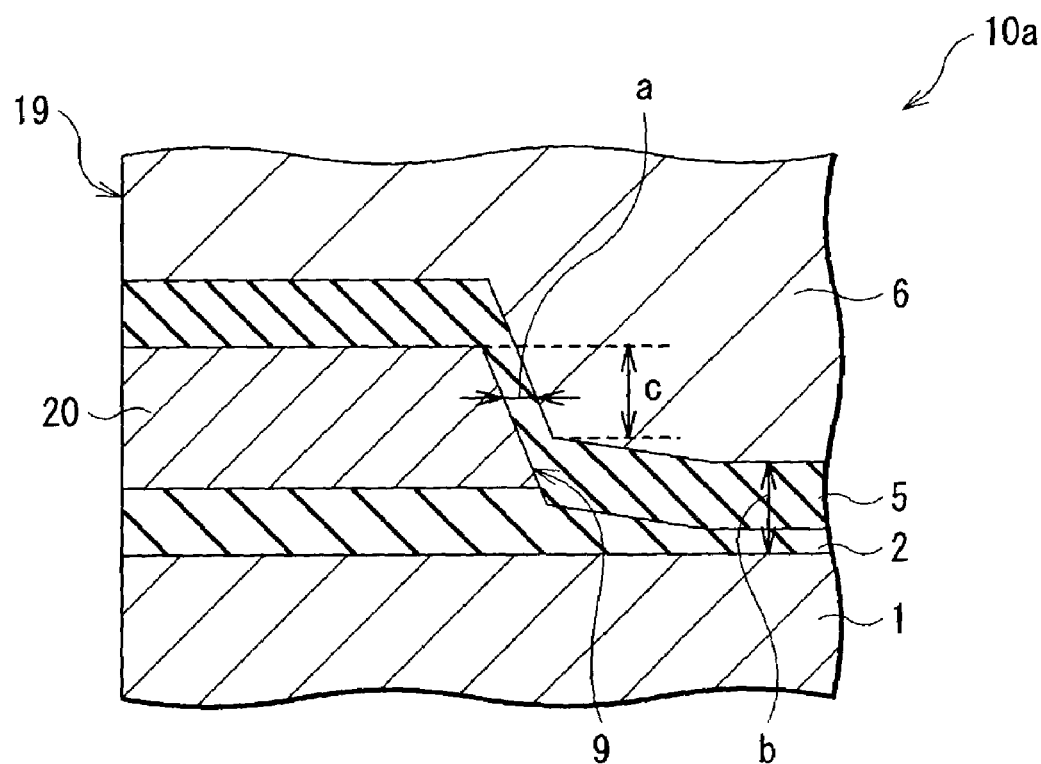
FIG. 17 is an enlarged sectional view of a thin film magnetic head according to a second embodiment of the invention in a direction perpendicular to a recording-medium-facing surface.

Referring to FIG. 17, the thin film magnetic head 10 according to the second embodiment will be described in more detail. FIG. 17 shows a sectional view of the structure of a reproducing head portion 10a according to the embodiment. The reproducing head portion 10a is disposed so that one end surface thereof faces the magnetic recording medium 11, and comprises the GMR film 20 which detects a signal magnetic field from the magnetic recording medium 11, and a pair of shield layers which are disposed so as to surround the GMR film 20 except for one end surface of the GMR film 20, and magnetically shields the GMR film 20, that is, the bottom shield layer 1 and the top shield layer 6. Gap layers for electrically insulating between the GMR film 20 and the bottom and the top shield layer 1 and 6, that is, the bottom gap layer 2 and the top gap layer 5 are formed therebetween, and a portion of the top gap layer 5 in contact with an end surface 9 of the GMR film 20 on a side, the side being opposite to a side facing the magnetic recording medium 11 has a thickness ranging from 2 nm to 30 nm inclusive.

More specifically, as shown in FIG. 17, the reproducing head portion 10a comprises, for example, a laminate including the bottom shield layer 1, the bottom gap layer 2, the GMR film 20, the top gap layer 5 and the top shield layer 6 in order on the base substrate 100 on a side close to the ABS 19. In this case, the end surface 9 of the GMR film 20 on a side opposite to the ABS 19 is completely coated with the top gap layer 5. The top gap layer 5 and the bottom gap layer 2 are in contact with each other on a side far from the end surface 9 when viewed from the ABS 19. A space behind a portion of the top gap layer 5 in contact with the end surface 9 (that is, a side opposite to the ABS 19) is completely filled with the top shield layer 6. A thickness a of the portion of the top gap layer 5 in contact with the end surface 9 is in a range from 2 nm to 30 nm inclusive. In this case, the top shield layer 6 preferably occupies a space corresponding to at least half of the thickness of the GMR film 20. In other words, a thickness c in FIG. 17 is preferably half or more of the thickness of the GMR film 20. Further, a distance b between the top shield layer 6 and the bottom shield layer 1 is preferably 2 nm or over. Herein, the bottom gap layer 1 and the top gap layer 5 are made of, for example, aluminum oxide ($Al_2O_3$) with a thermal conductivity of approximately 0.8 J/mKs. The bottom shield layer 1 and the top shield layer 6 are made of a NiFe alloy with a higher thermal conductivity of approximately 22 J/mKs than those of the bottom gap layer 2 and the top gap layer 5, or the like.

In the reproducing head portion 10a with such a structure, insulation between the GMR film 20 and the top and the bottom shield layers 6 and 1 can be secured, and heat can be efficiently transferred to the top shield layer 6 with a higher thermal conductivity than the top gap layer 5, so a temperature rise of the GMR film 20 can be inhibited.

In the embodiment, output characteristics equivalent to those shown in FIGS. 9 and 10 in the first embodiment can be obtained.

As described above, the thin film magnetic head 10 according to the embodiment comprises the GMR film 20 disposed so as to face the magnetic recording medium 11, the top and the bottom gap layers 5 and 2, and the top and the bottom shield layers 6 and 1, and a portion of the top gap layer 5 in contact with the end surface 9 of the GMR film 20 on a side opposite to the ABS 19 has a thickness ranging from 2 nm to 30 nm inclusive, so heat dissipation can be further improved. In other words, heat generated in the GMR film 20 is transferred to the top shield layer 6 made of a material with a higher thermal conductivity through a thinner portion of the top gap layer 5 so that the heat can be efficiently dissipated. Thereby, as in the case of the first embodiment, without degradation in output voltage due to increased electrical resistance or pronounced degradation in reproducing characteristics due to internal diffusion in the MR device, a downsizing of the MR device can be achieved.

The invention is described with reference to some embodiments, but the invention is not limited to these embodiments, and can be variously modified. For example, in the embodiments, the thin film magnetic head comprising the GMR film exposed to the recording-medium-facing surface (ABS) is described, but the invention is not limited to this. The invention may be applicable to a thin film magnetic head having a structure in which the GMR film is comprised in the interior thereof, and a magnetic path from the ABS to the GMR film is formed with a flux guide or the like. Moreover, in the above embodiments, a CIP (current flow-in-the-plane of the layers) type thin film magnetic head is described, but the invention is not limited to this, and is applicable to a CPP (current perpendicular-to-the-plane) type thin film magnetic head or a TMR (tunneling magnetoresistance) head.

As described above, in the thin film magnetic head, the method of manufacturing the thin film magnetic head or the magnetic disk drive according to an aspect of the invention, the heat dissipation layer being disposed adjacent to the magnetic transducer film on a side, the side being opposite to a side facing the recording medium, and transferring heat generated in the magnetic transducer film to outside is comprised, so the heat generated in the magnetic transducer film can be more effectively dissipated than previously possible, thereby a temperature rise can be inhibited. Therefore, even if the size of the magnetic transducer film is reduced, an increase in electrical resistance can be inhibited, and a higher read output can be obtained.

More specifically, in the thin film magnetic head or the method of manufacturing the thin film magnetic head according to the aspect of the invention, the insulating layer is disposed between the magnetic transducer film and the heat dissipation layer, so even if the heat dissipation layer is made of an electrically conductive material, a sense current can be prevented from being diverted to the heat dissipation layer.

Moreover, in the thin film magnetic head or the method of manufacturing the thin film magnetic head according to the aspect of the invention, the thickness of the heat dissipation layer corresponds to at least half of the thickness of the magnetic transducer film, so heat dissipation can be more effectively obtained.

Further, in the thin film magnetic head or the method of manufacturing the thin film magnetic head according to another aspect of the invention, the magnetic transducer film disposed so as to face the recording medium, a pair of shield layers and the gap layer for insulating between the magnetic transducer film and the pair of shield layers are comprised, a portion of the gap layer in contact with an end surface of the magnetic transducer film on a side opposite a side facing the recording medium is formed with a thin thickness ranging from 2 nm to 30 nm inclusive, so heat dissipation can be improved more than previously possible. In other words, the heat generated in the magnetic transducer film is transferred to either of the pair of shield layers with a higher thermal conductivity through the thinner portion of the gap layer, thereby the heat can be efficiently dissipated, and a temperature rise can be inhibited. Therefore, even if the size of the magnetic transducer film is reduced, an increase in electrical resistance can be inhibited, and a higher read output can be obtained.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head, comprising:
    a magnetic transducer film being disposed so that a first end surface thereof faces a recording medium, and detecting a signal magnetic field from the recording medium;
    a pair of shield layers that magnetically shield the magnetic transducer film and being disposed so as to surround a second end surface of the magnetic transducer film and both film surfaces of the magnetic transducer film, the second end surface on the opposite side to the first end surface thereof; and
    a gap layer being disposed between the magnetic transducer film and the pair of shield layers, and electrically insulating therebetween, wherein a portion of the gap layer in contact with the end surface of the magnetic transducer film on a side, the side being opposite to a side facing the recording medium has a thickness ranging from 2 nm to 20 nm inclusive.

2. A thin film magnetic head according to claim 1, wherein the pair of shield layers occupy a space corresponding to at least half of the thickness of the magnetic transducer film, and have a distance of at least 2 nm therebetween.

3. A method of manufacturing a thin film magnetic head, the thin film magnetic head comprising a magnetic transducer film being disposed so that a first end surface thereof faces a recording medium, and detecting a signal magnetic field from the recording medium, a pair of shield layers magnetically shielding the magnetic transducer film, and a gap layer electrically insulating between the magnetic transducer film and the pair of shield layers, the method comprising the steps of:

forming the magnetic transducer film;

forming the pair of shield layers so as to surround a second end surface of the magnetic transducer film and both film surfaces of the magnetic transducer film, the second end surface on the opposite side to the first end surface thereof; and forming the gap layer between the magnetic transducer film and the pair of shield layers so that a portion of the gap layer in contact with the end surface of the magnetic transducer film on a side, the side being opposite to a side facing the recording medium has a thickness ranging from 2 nm to 20 nm inclusive.

4. A method of manufacturing a thin film magnetic head according to claim 3, wherein in the step of forming the pair of shield layers, the pair of shield layers occupy a space corresponding to at least half of the thickness of the magnetic transducer film, and has a distance of at least 2 nm therebetween.

5. A magnetic disk drive, comprising:

a recording medium; and a thin film magnetic head, wherein the thin film magnetic head comprises:

a magnetic transducer film being disposed so that a first end surface thereof faces the recording medium, and detecting a signal magnetic field from the recording medium, a pair of shield layers that magnetically shield the magnetic transducer film and being disposed so as to surround a second end surface of the magnetic transducer film and both film surfaces of the magnetic transducer film, the second end surface on the opposite side to the first end surface thereof; and a gap layer being disposed between the magnetic transducer film and the pair of shield layers, and electrically insulating therebetween, wherein a portion of the gap layer in contact with the end surface of the magnetic transducer film on a side, the side being opposite to a side facing the recording medium has a thickness ranging from 2 nm to 20 nm inclusive.

* * * * *